United States Patent
Hagihara

(10) Patent No.: US 10,536,290 B2
(45) Date of Patent: Jan. 14, 2020

(54) DATA TRANSMISSION SYSTEM, MANAGEMENT DEVICE, NON-TRANSITORY RECORDING MEDIUM RECORDING DATA TRANSMISSION PROGRAM, AND DATA TRANSMISSION METHOD

(71) Applicant: TLV CO., LTD., Hyogo (JP)

(72) Inventor: Kazunari Hagihara, Kakogawa (JP)

(73) Assignee: TLV CO., LTD., Hyogo (JP)

( * ) Notice: Subject to any disclaimer, the term of this patent is extended or adjusted under 35 U.S.C. 154(b) by 0 days.

(21) Appl. No.: 15/936,781

(22) Filed: Mar. 27, 2018

(65) Prior Publication Data
US 2018/0227136 A1 Aug. 9, 2018

Related U.S. Application Data

(63) Continuation of application No. PCT/JP2015/077639, filed on Sep. 29, 2015.

(51) Int. Cl.
*H04W 28/04* (2009.01)
*H04L 12/18* (2006.01)
(Continued)

(52) U.S. Cl.
CPC ....... *H04L 12/185* (2013.01); *H04B 7/15528* (2013.01); *H04B 7/2606* (2013.01);
(Continued)

(58) Field of Classification Search
CPC ... H04L 12/185; H04L 12/1868; H04L 67/34; H04L 67/12; H04W 72/005;
(Continued)

(56) References Cited

U.S. PATENT DOCUMENTS

2006/0154603 A1* 7/2006 Sachs .................. H04L 1/1635
455/39
2010/0302988 A1* 12/2010 Becker ................ H04L 12/1877
370/312
(Continued)

FOREIGN PATENT DOCUMENTS

EP    2 991 364 A1    3/2016
EP    2991364 A1 *    3/2016   ............ H04W 52/02
(Continued)

OTHER PUBLICATIONS

The extended European search report issued by the European Patent Office dated Sep. 13, 2018, which corresponds to European Patent Application No. 15905360.2-1213 and is related to U.S. Appl. No. 15/936,781.
(Continued)

*Primary Examiner* — Lakeram Jangbahadur
(74) *Attorney, Agent, or Firm* — Studebaker & Brackett PC

(57) ABSTRACT

A management device that transmits data to a plurality of terminal devices by way of communication relay devices on a connected communication network and controls the plurality of terminal devices includes a transmission data storage section and a communication control section. The transmission data storage section stores transmission data. The communication control section controls communication with the terminal devices. The communication control section issues start notification of data transmission in one-to-one communication to each terminal device that is a transmission target of the terminal devices, and receives a response from the terminal device in response to the start notification, starts transmission of the transmission data in one-to-multiple communication after the start notification, and issues, after completion of the transmission of the transmission data, a transmission request of a reception (Continued)

TRAP OPERATION STATUS PROVIDER DEVICE 110 status of the transmission data in one-to-one communication to a terminal device that has responded to the start notification.

4 Claims, 26 Drawing Sheets

(51) Int. Cl.
- *H04L 29/08* (2006.01)
- *H04B 7/155* (2006.01)
- *H04B 7/26* (2006.01)
- *H04W 72/00* (2009.01)
- *H04W 84/04* (2009.01)

(52) U.S. Cl.
CPC .......... *H04L 12/1868* (2013.01); *H04L 67/34* (2013.01); *H04W 28/04* (2013.01); *H04W 72/005* (2013.01); *H04L 67/12* (2013.01); *H04W 84/047* (2013.01)

(58) Field of Classification Search
CPC .. H04W 28/04; H04W 84/047; H04B 7/2606; H04B 7/15528
See application file for complete search history.

(56) References Cited

U.S. PATENT DOCUMENTS

| | | |
|---|---|---|
| 2014/0307581 A1 | 10/2014 | Yoneyama et al. |
| 2016/0043891 A1* | 2/2016 | Hagihara ................ H04Q 9/00 370/311 |

FOREIGN PATENT DOCUMENTS

| | | |
|---|---|---|
| JP | H11-512910 A | 11/1999 |
| JP | 2007-306498 A | 11/2007 |
| JP | 2010-199955 A | 9/2010 |
| JP | 2014-207629 A | 10/2014 |
| JP | 2014-225897 A | 12/2014 |
| WO | 97/13379 A1 | 4/1997 |
| WO | 2004/023736 A1 | 3/2004 |
| WO | 2008/020731 A1 | 2/2008 |

OTHER PUBLICATIONS

International Search Report issued in PCT/JP2015/077639; dated Dec. 8, 2015.

* cited by examiner

FIG. 8

TIME SLOT SET TIME INFORMATION

| SLOT NUMBER | START TIME | END TIME |
|---|---|---|
| 1 | 0 | 30 |
| 2 | 30 | 60 |
| 3 | 60 | 90 |
| 4 | 90 | 120 |
| 5 | 120 | 150 |
| 6 | 150 | 180 |
| 7 | 180 | 210 |
| ~ | ~ | ~ |
| 119 | 3540 | 3570 |
| 120 | 3570 | 3600 |

FIG. 9

TIME SLOT ASSIGNMENT INFORMATION

| SLOT NUMBER | PROCESS SYSTEM CONSTITUENT DEVICE ID |
|---|---|
| 1 | 0 |
| 2 | R1 |
| 3 | R2 |
| 4 | R3 |
| 5 | R4 |
| 6 | R5 |

FIG. 10

NETWORK ARCHITECTURE INFORMATION

| LOWER-LAYER PROCESS SYSTEM CONSTITUENT DEVICE ID | HIGHER-LAYER PROCESS SYSTEM CONSTITUENT DEVICE ID |
|---|---|
| R1 | TRAP OPERATION STATUS MANAGEMENT DEVICE |
| R2 | R1 |
| R3 | R1 |
| R4 | R3 |
| R5 | TRAP OPERATION STATUS MANAGEMENT DEVICE |

FIG. 12

OPERATION STATUS RELAY TIME INFORMATION

| PROCESS SYSTEM CONSTITUENT DEVICE ID | START TIME | END TIME |
|---|---|---|
| T4 | 0 | 0.5 |
| T5 | 0.5 | 1 |
| T6 | 1 | 1.5 |

FIG. 13

OPERATION STATUS INFORMATION

| OPERATION STATUS TYPE | OPERATION STATUS VALUE | OPERATION STATUS VALUE ACQUISITION TIME POINT |
|---|---|---|
| TEMPERATURE | 98.00°C | 2015/07/15 00:01:32 |
| VIBRATION | 40kHz | 2015/07/15 00:01:32 |

FIG. 14

OPERATION STATUS INFORMATION DB

| PROCESS SYSTEM CONSTITUENT DEVICE ID | OPERATION STATUS TYPE | OPERATION STATUS VALUE | OPERATION STATUS VALUE ACQUISITION TIME POINT | RECEPTION TIME POINT |
|---|---|---|---|---|
| T1 | TEMPERATURE | 98.01°C | 2015/07/15 00:00:02 | 2015/07/15 00:00:15 |
| T1 | VIBRATION | 38kHz | 2015/07/15 00:00:02 | 2015/07/15 00:00:15 |
| ~ | ~ | ~ | ~ | ~ |
| T5 | TEMPERATURE | 98.00°C | 2015/07/15 00:01:32 | 2015/07/15 00:01:45 |
| T5 | VIBRATION | 40kHz | 2015/07/15 00:01:32 | 2015/07/15 00:01:45 |

FIG. 15

GROUP INFORMATION

| HIGHER-LAYER PROCESS SYSTEM CONSTITUENT DEVICE ID (GROUP ID) | LOWER-LAYER PROCESS SYSTEM CONSTITUENT DEVICE ID (BELONGING DEVICE ID) |
|---|---|
| R1 | T12 |
|  | T13 |
|  | T14 |
| R2 | T1 |
|  | T2 |
|  | T3 |
| R3 | T10 |
|  | T11 |
|  | ... |
| R4 | T4 |
|  | T5 |
|  | T6 |
| R5 | T7 |
|  | T8 |
|  | T9 |

FIG. 16

DATA TRANSMISSION PROGRESS INFORMATION

| HIGHER-LAYER PROCESS SYSTEM CONSTITUENT DEVICE ID (GROUP ID) | STATUS | TRANSMITTED ADDRESS | RESPONDED DEVICE ID | RECEPTION STATUS (MEMORY MAP) | RETRANSMISSION ADDRESS |
|---|---|---|---|---|---|
| R1 | 5 | xxxxx | T2, T3, T4 | ... | xxxxx~xxxxx, xxxxx~xxxxx |
| R2 | 4 | xxxxx | T1, T2, T3 | ... | : |

FIG. 17

MEMORY MAP

|   | 7 | 6 | 5 | 4 | 3 | 2 | 1 | 0 |
|---|---|---|---|---|---|---|---|---|
| 0 | 1 | 1 | 1 | 1 | 1 | 1 | 1 | 1 |
| 1 | 1 | 1 | 1 | 1 | 1 | 0 | 1 | 1 |
| 2 | ... | ... | ... | ... | ... | ... | ... | ... |
| 3 | ... | ... | ... | ... | ... | ... | ... | ... |
| 4 | ... | ... | ... | ... | ... | ... | ... | ... |
| 5 | ... | ... | ... | ... | ... | ... | ... | ... |
| 6 | ... | ... | ... | ... | ... | ... | ... | ... |
| 7 | ... | ... | ... | ... | ... | ... | ... | ... |

FIRMWARE TRANSMISSION PROCESS

DATA TRANSMISSION SYSTEM,
MANAGEMENT DEVICE,
NON-TRANSITORY RECORDING MEDIUM
RECORDING DATA TRANSMISSION
PROGRAM, AND DATA TRANSMISSION
METHOD

CROSS-REFERENCE TO RELATED
APPLICATION

This is a continuation of PCT International Application PCT/JP2015/077639 filed on Sep. 29, 2015. The disclosure of this application including the specification, the drawings, and the claims is hereby incorporated by reference in its entirety.

FIELD

The present invention relates to, for example, a data transmission system that transmits data from a management device to a plurality of terminal devices by way of communication relay devices on a communication network.

BACKGROUND

As described in Japanese Patent Application Publication No. 2014-207629, for example, in a case where a plurality of communication devices performs packet communication on a communication network, a plurality of communication modes such as unicast and multicast are employed.

Japanese Patent Application Publication No. 2014-225897, for example, describes a configuration in which a terminal control device and terminal devices perform packet communication wirelessly by way of relay devices (repeater devices) on a communication network. In such a configuration, in updating firmware of a terminal device, the terminal control device transmits data of firmware for update to the terminal device. This data transmission employs a communication mode of any one of unicast, multicast, or broadcast.

SUMMARY

In transmission to the plurality of terminal devices as described above, in the case of unicast, as the number of terminal devices increases, a wider communication band is occupied, and thus, battery consumption in, for example, relay devices increases. In the cases of multicast and broadcast, the communication band occupancy and battery consumption can be reduced, but acknowledgement (ACK) from each terminal device to transmission cannot be requested. Thus, it is not certain that each terminal device receives data. In particular, in transmitting important data such as update of firmware, for example, it is necessary to employ a highly reliable communication mode.

An object of some aspects of the present invention is to provide, for example, a data transmission system that employs both one-to-one communication and one-to-multiple communication to enable data transmission with high reliability while reducing a communication band occupancy and battery consumption.

A data transmission system according to a first aspect of the present invention includes: a plurality of terminal devices; a management device that controls the plurality of terminal devices; and communication relay devices that relay communication between the terminal devices and the management device, the terminal devices, the management device, and the communication relay devices being connected to a communication network so that the management device transmits data to the plurality of terminal devices. The management device includes a transmission data storage section that stores transmission data and a first communication control section that controls communication with the plurality of terminal devices. The terminal device includes a second communication control section that controls communication with the management device and a received data storage section that stores received transmission data. The first communication control section issues start notification of data transmission in one-to-one communication to each terminal device that is a transmission target of the plurality of terminal devices, and receives a response from the terminal device in response to the start notification, starts transmission of the transmission data in one-to-multiple communication after the start notification, and issues, after completion of transmission of the transmission data, a transmission request of a reception status of the transmission data in one-to-one communication to a terminal device that has responded to the start notification. The second communication control section responds to the management device in response to the received start notification, then stores the received transmission data in the received data storage section, and transmits the reception status in response to the transmission request.

A management device that transmits data to a plurality of terminal devices by way of communication relay devices on a connected communication network and controls the plurality of terminal devices according to a second aspect of the present invention includes: a transmission data storage section that stores transmission data; and a communication control section that controls communication with the plurality of terminal devices. The communication control section issues start notification of data transmission in one-to-one communication to each terminal device that is a transmission target of the plurality of terminal devices, and receives a response from the terminal device in response to the start notification, starts transmission of the transmission data in one-to-multiple communication after the start notification, and issues, after completion of the transmission of the transmission data, a transmission request of a reception status of the transmission data in one-to-one communication to a terminal device that has responded to the start notification.

The communication control section may transmit divided data obtained by dividing the transmission data into predetermined sizes, together with address information.

The communication control section may receive, as the reception status, information specifying a region of the transmission data unreceived by the terminal device, from the terminal device.

The management device may further include a group information storage section that stores group information on groups to which each of the plurality of terminal devices belongs and information on a communication time frame of one or more terminal devices for each group, and the communication control section may issue the start notification, transmit transmission data, and issue a transmission request for a reception status to each terminal device belonging to a group in a transmissible state, based on the group information and the information on the communication time frame.

The group information storage section may store a progress status of transmission of the transmission data for each group, and the communication control section may transmit the transmission data to each terminal device belonging to the group in the transmissible state based on the progress status and updates the progress status of the group.

A non-transitory recording medium recording a data transmission program according to a third aspect of the present invention causes a computer of a management device that transmits data to a plurality of terminal devices by way of communication relay devices on a connected communication network and controls the plurality of terminal devices to function as a communication control section that controls communication with the plurality of terminal devices. The communication control section issues start notification of data transmission in one-to-one communication to each terminal device that is a transmission target of the plurality of terminal devices, and receives a response from the terminal device in response to the start notification, starts transmission of transmission data stored in a storage section in one-to-multiple communication after the start notification, and issues, after completion of transmission of the transmission data, a transmission request of a reception status of the transmission data in one-to-one communication to a terminal device that has responded to the start notification.

A data transmission method in which a plurality of terminal devices, a management device that controls the plurality of terminal devices, and communication relay devices that relay communication between the terminal devices and the management device are connected to a communication network so that the management device transmits data to the plurality of terminal devices according to a fourth aspect of the present invention includes the steps of: issuing start notification of data transmission in one-to-one communication from the management device to each terminal device that is a transmission target of the plurality of terminal devices, and receiving a response from the terminal device in response to the start notification by the management device; starting transmission of transmission data in one-to-multiple communication from the management device after the start notification; issuing, after completion of transmission of the transmission data, a transmission request of a reception status of the transmission data in one-to-one communication from the management device to a terminal device that has responded to the start notification; and responding by the terminal device to the management device in response to the received start notification, and then, storing the received transmission data in a received data storage section, and transmitting the reception status in response to the transmission request.

According to some aspects of the present invention, in data transmission, terminal devices that have responded to start notification are specified as targets of data transmission, and after completion of transmission of transmission data in one-to-multiple communication, it is determined, based on a reception status, whether the transmission data was received in one-to-one communication by the specified terminal devices. Thus, communication is performed in one-to-one communication at the start and the end of the data transmission and transmission data is transmitted in one-to-multiple communication. Accordingly, the number of transmissions of transmission data can be reduced, and data transmission can be performed with high reliability with reduction of a wireless communication band occupancy and battery consumption.

BRIEF DESCRIPTION OF THE DRAWINGS

FIG. 8 is a table showing a data structure of time slot set time information.

FIG. 9 is a table showing a data structure of time slot assignment information.

FIG. 10 is a table showing a data structure of network architecture information.

FIG. 12 is a table showing a data structure of operation status relay time information.

FIG. 13 is a table showing a data structure of operation status information.

FIG. 14 is a table showing a data structure of an operation status information database DB.

FIG. 15 is a table showing a data structure of group information.

FIG. 16 is a table showing a data structure of data transmission progress information.

FIG. 17 is a table showing a data structure of a memory map.

DESCRIPTION OF EMBODIMENTS

A data transmission system, a management device, a data transmission program, and a data transmission method as embodiments of the present invention will be described with reference to the drawings. Description will now be given on a trap operation status management system that manages operation statuses of steam traps for use in a steam system, as an example of a data transmission system according to an embodiment of the present invention. The configuration of the present invention is not limited to embodiments. Processes constituting each flow in the description below may be arranged in any order as long as the processes are not contradictory to each other.

First Embodiment

I. Hardware Configuration of Trap Operation Status Management System 100

Figure 1:
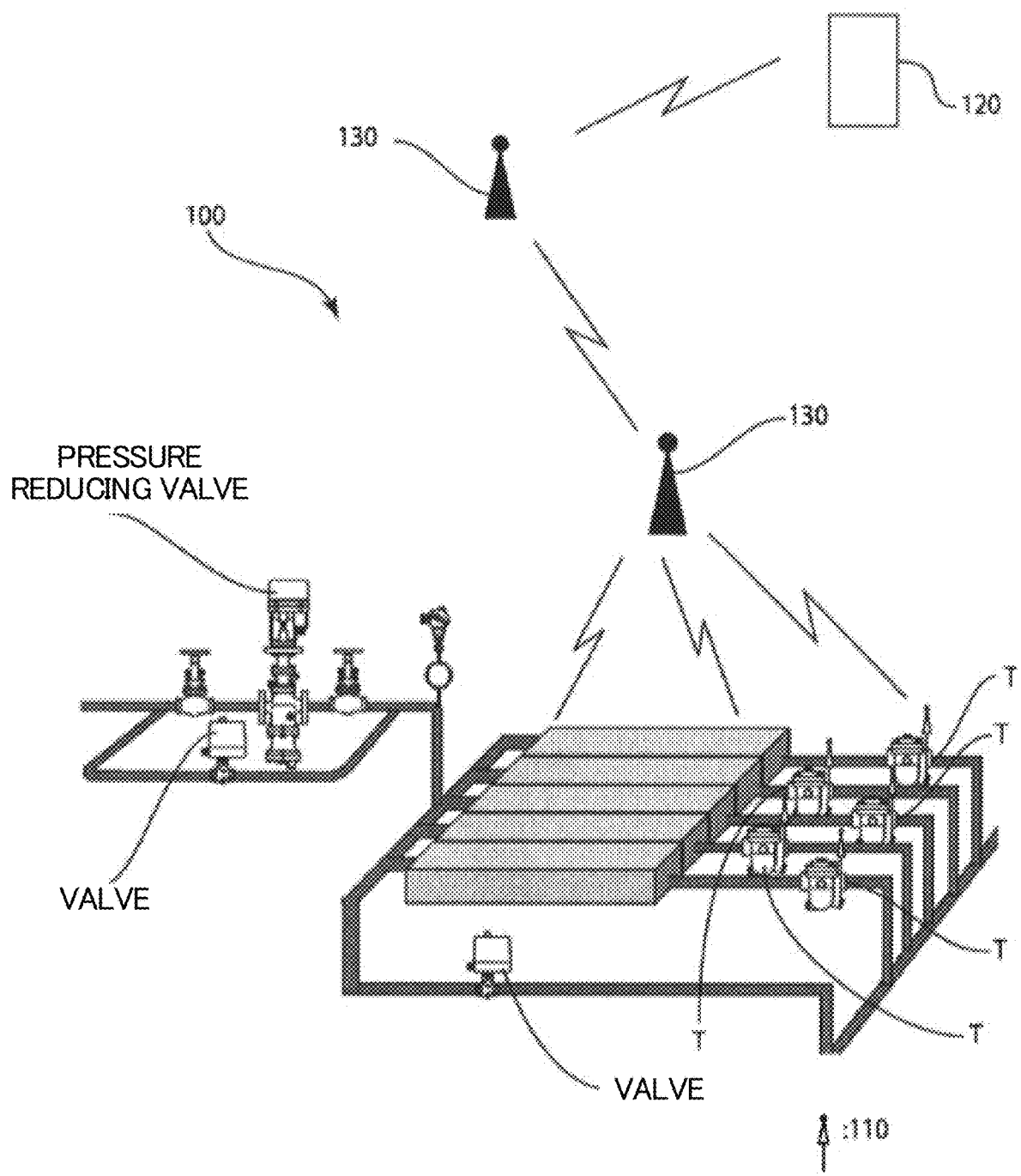
FIG. 1 is a view illustrating a configuration of a trap operation status management system as an embodiment to which a data transmission system according to the present invention is applied.

A trap operation status management system 100 will be described with reference to FIG. 1. The trap operation status management system 100 is a system that manages operation statuses of a large number of steam traps T distributed in a process system formed in, for example, a factory or a plant through wireless communication. The trap operation status management system 100 includes trap operation status provider devices (terminal devices) 110, a trap operation status management device (management device) 120, and communication relay devices 130. FIG. 1 illustrates part of the trap operation status provider devices 110 and the communication relay devices 130 included in the trap operation status management system 100.

The trap operation status management system 100 manages update of firmware of the trap operation status provider devices (terminal devices) 110.

The trap operation status management device 120 acquires operation statuses from the trap operation status provider devices 110 through the communication relay devices 130 to thereby manage an operation status of each steam trap T and determine the operation status.

Concurrently with the acquisition of the operation status, the trap operation status management device 120 wirelessly transmits data of firmware for update to each trap operation status provider device 110 and causes the trap operation status provider device 110 to update the firmware. In this data transmission, the trap operation status management device 120 employs both unicast (one-to-one communication) and broadcast (one-to-multiple communication) to thereby transmit data with high reliability while reducing the communication band occupancy and battery consumption. This will be described in detail later. In this embodiment, the firmware includes a program such as an operating system (OS) stored in a memory 110b of each trap operation status provider device 110, for example.

The unicast refers to a communication mode of one-to-one communication to a single specified destination (a single specified address) on the network. The broadcast is an example of one-to-multiple communication, and refers to a communication mode in which data is transmitted to a large number of unspecified destinations (in one way) by using broadcast addresses within the network (e.g., in the same LAN).

Figure 3:
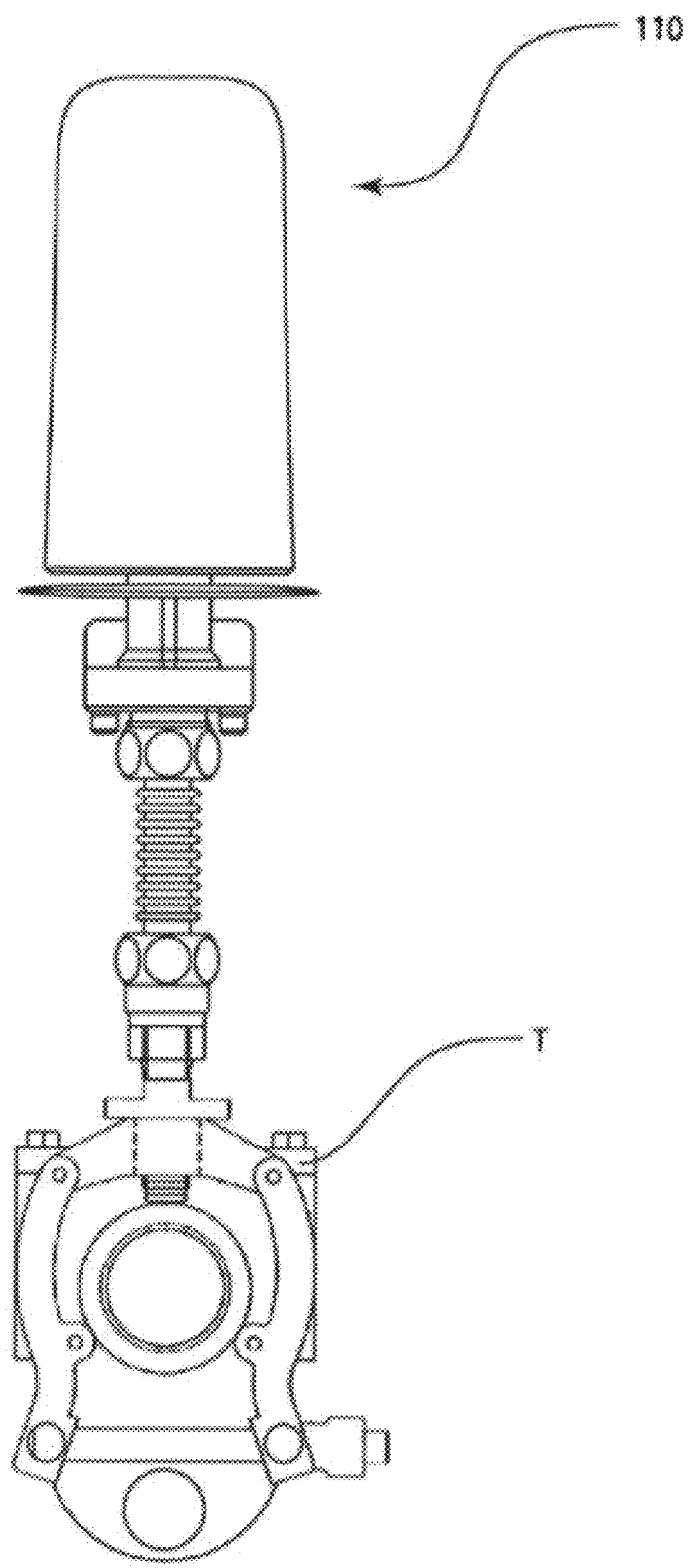
FIG. 3 is a view illustrating a state in which the trap operation status provider device is attached to a steam trap.

The trap operation status provider devices 110 are disposed for the individual steam traps T constituting a process system. As illustrated in FIG. 3, each of the trap operation status provider devices 110 is attached to the corresponding steam trap T to acquire (measure) an operation status of the steam trap T. At a time point previously determined for each trap operation status provider device 110, the trap operation status provider device 110 transmits the acquired operation status (operation status information) to the communication relay device 130 with which the trap operation status provider device 110 itself directly communicates. The trap operation status provider devices 110 receive data of firmware from the trap operation status management device 120 and update the firmware.

Each of the communication relay devices 130 temporarily stores operation status information acquired from the trap operation status provider devices 110, and when a relay operation status provision time point previously determined for each communication relay device 130 arrives, the communication relay device 130 transmits the acquired operation status to the trap operation status management device 120. Each of the communication relay devices 130 receives an operation status of its lower-layer communication relay device 130 and performs relay transmission to its upper-layer communication relay device 130 or the trap operation status management device 120 when the lower-layer communication relay device 130 provides an operation status to the trap operation status management device 120.

II. Hardware Configuration of Trap Operation Status Provider Device 110

Figure 2:
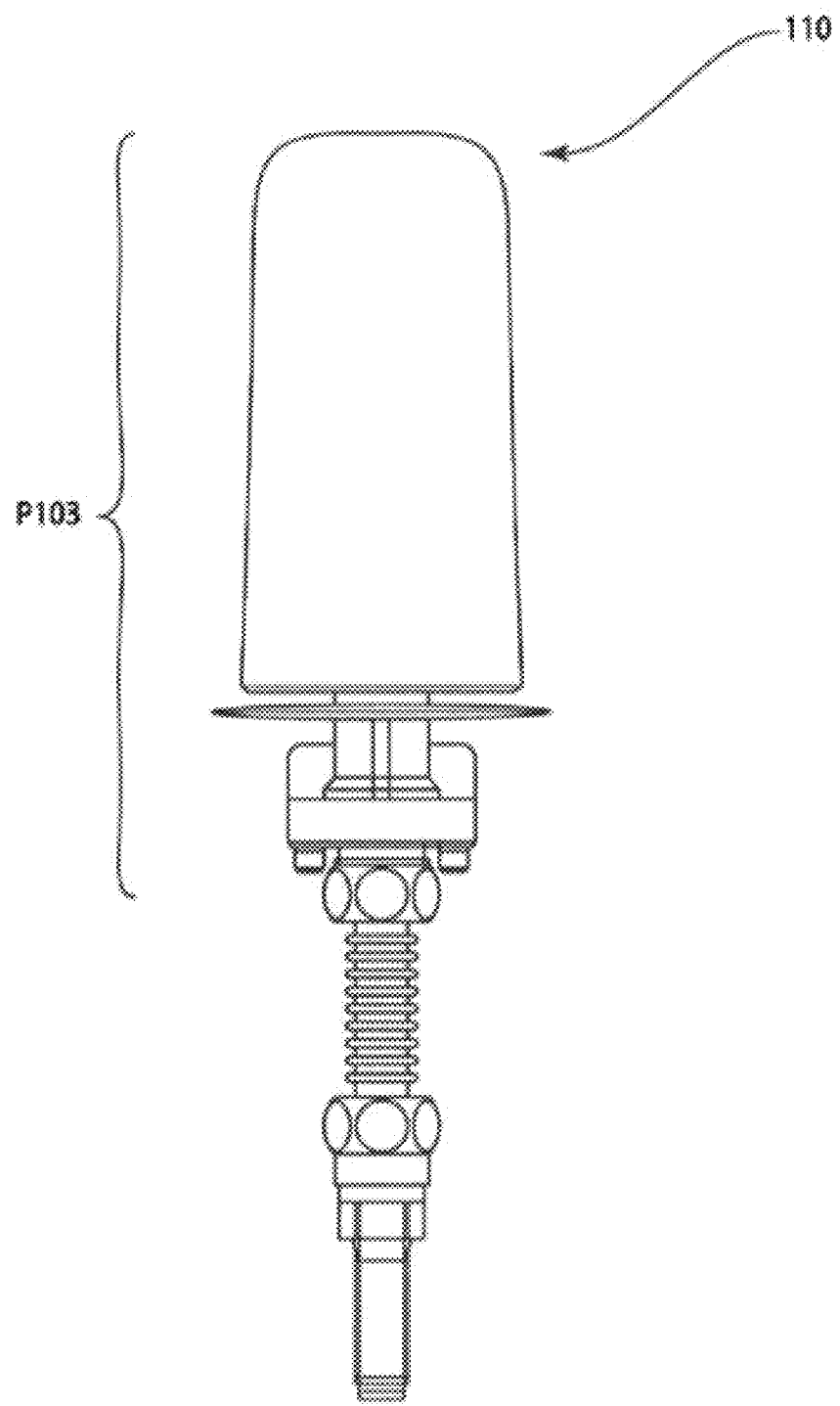
FIG. 2 is a view illustrating an outer configuration of a trap operation status provider device.

Next, a hardware configuration of electric components disposed inside an electric component arrangement part P103 of the trap operation status provider device 110 illustrated in FIG. 2 will be described with reference to FIG. 4.

Figure 4:
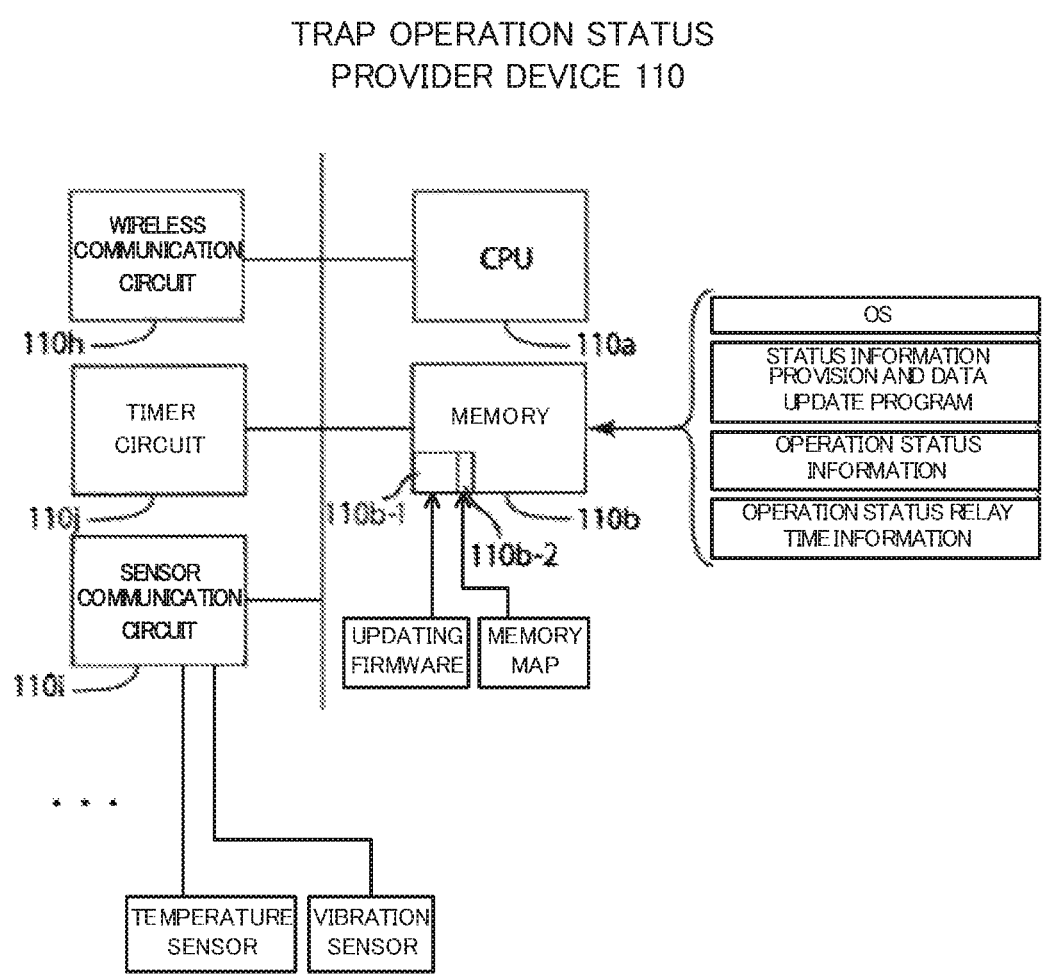
FIG. 4 is a view illustrating a hardware configuration of the trap operation status provider device.

As illustrated in FIG. 4, the trap operation status provider device 110 includes a CPU 110a, a memory 110b, a wireless communication circuit 110h, a sensor communication circuit 110i, and a timer circuit 110j.

The CPU 110a performs processes based on an operating system (OS), a status information provision and data update program, and other applications stored in the memory 110b. The memory 110b includes a RAM and an EEPROM. The RAM provides a work area for the CPU 110a. The EEPROM stores and holds an operating system (OS), a status information provision and data update program (firmware), and other programs and various types of data such as operation status information (see FIG. 13) and operation status relay time information (see FIG. 12). The various types of data will be described later.

The status information provision and data update program causes each of the trap operation status provider devices 110 to acquire operation status information of the corresponding steam trap T by using sensors and transmit the information to the management device 120. This program also causes each trap operation status provider device 110 to receive firmware for update (update firmware) from the trap operation status management device 120 and update the firmware.

In the EEPROM, a firmware update data storage region 110b-1 and a memory map region 110b-2 are set. The update data storage region 110b-1 is a region for storing and holding update firmware transmitted from the trap operation status management device 120. Data of the update firmware transmitted from the trap operation status management device 120 is first stored and held in the update data storage region 110b-1, and then is rewritten to a corresponding firmware storage region on condition that rewrite permission is received. The memory 110b (EEPROM) corresponds to a received data storage section.

The memory map region 110b-2 is a region for storing and holding a memory map (see FIG. 17) of update firmware stored in the update data storage region. The memory map is information indicating reception statuses (storage statuses) of data on update firmware from the trap operation status management device 120. Data on update firmware transmitted from the trap operation status management device 120 will be sometime referred to simply as firmware.

The wireless communication circuit 110h transmits and receives data to and from external communication equipment such as the trap operation status management device 120 by wireless communication (packet communication). The sensor communication circuit 110i is connected to sensors disposed in the trap operation status provider device 110, such as a temperature sensor and a vibration sensor, and acquires operation status information of the steam trap T from the sensors. The timer circuit 110j generates a predetermined clock and measures a predetermined time. The CPU 110a and the wireless communication circuit 110h correspond to a second communication control section according to the present invention.

III. Hardware Configuration of Trap Operation Status Management Device 120

Figure 5:
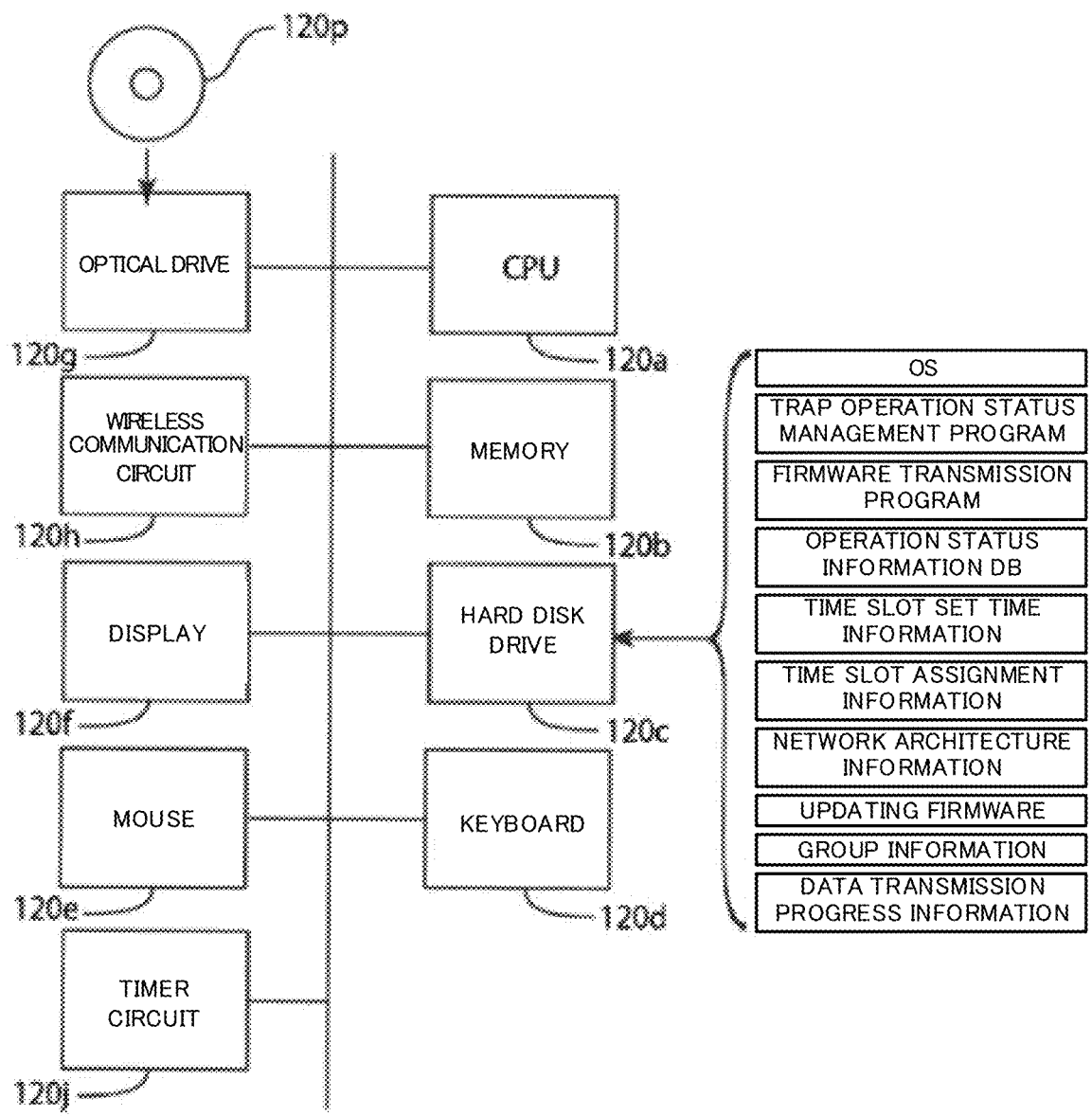
FIG. 5 is a view illustrating a hardware configuration of the trap operation status management device.

A hardware configuration of the trap operation status management device 120 will be described with reference to FIG. 5. As illustrated in FIG. 5, the trap operation status management device 120 includes a CPU 120a, the memory 120b, a hard disk drive 120c (hereinafter referred to as an HDD 120c), a keyboard 120d, a mouse 120e, a display 120f, an optical drive 120g, a wireless communication circuit 120h, and a timer circuit 120j.

The CPU 120a performs processes based on an operating system (OS), a trap operation status information management program, and a firmware transmission program (data transmission program) stored and held in the HDD 120c, and other applications. The memory 120b provides a work area for the CPU 120a. The HDD 120c stores and holds an operating system (OS), a trap operation status information management program, a firmware transmission program, and programs of other applications. The HDD 120c stores and holds various types of data such as an operation status information database (hereinafter referred to as an operation status information DB) (see FIG. 14), time slot set time information (see FIG. 8), time slot assignment information (see FIG. 9), and network architecture information (see FIG. 10). The various types of data will be described later.

The trap operation status information management program causes the trap operation status management device 120 to acquire operation status information from the trap operation status provider devices 110 and manage operation statuses of the steam traps T. The firmware transmission program causes the trap operation status management device 120 to transmit data of update firmware to the trap operation status provider devices 110 and instruct update of the firmware.

The HDD 120c also stores and holds data such as update firmware (transmission data), group information (see FIG. 15), and data transmission progress information (see FIG. 16) for use in transmitting update firmware. The HDD 120c corresponds to a transmission data storage section.

The keyboard 120d and the mouse 120e receive an instruction from outside. The display 120f displays an image such as a user interface. The optical drive 120g reads data from an optical medium, such as reads a trap operation status information management program and a firmware update program from an optical medium 120p recording a trap operation status information management server program (not shown) or reads a program of another application from another optical medium. The wireless communication circuit 120h transmits and receives data to and from external communication equipment such as the trap operation status provider devices 110 by wireless communication (packet communication). The timer circuit 120j generates a predetermined clock, and generates a time point as a reference for the trap operation status management device 120. The CPU 120a and the wireless communication circuit 120h correspond to a first communication control section (communication control section) according to the present invention.

IV. Hardware Configuration of Communication Relay Device 130

Figure 6:
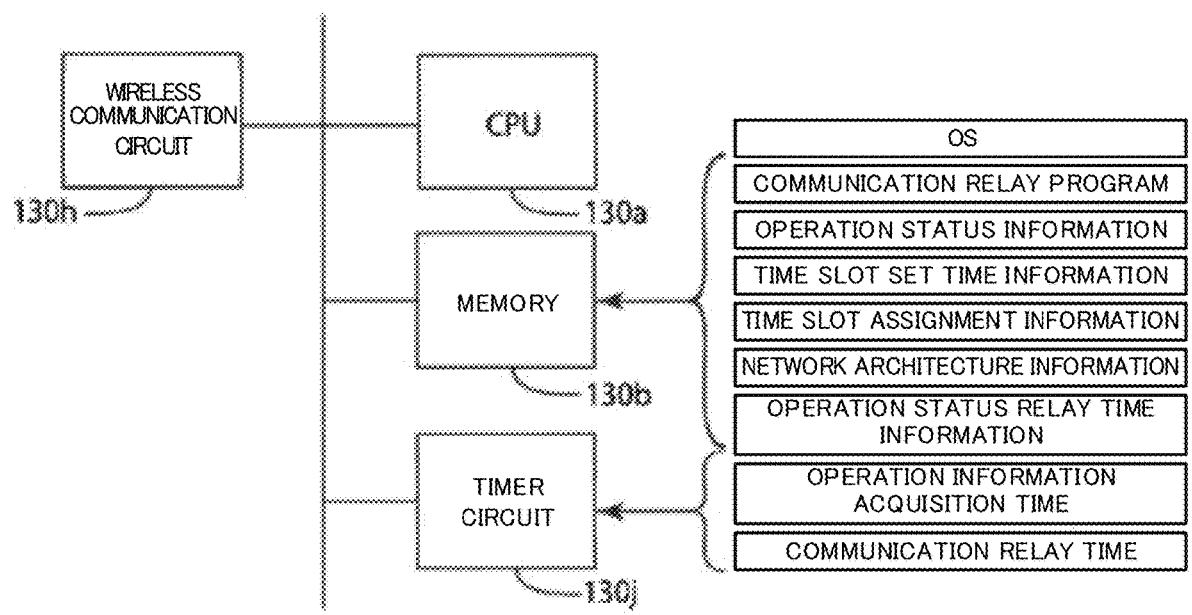
FIG. 6 is a view illustrating a hardware configuration of a communication relay device.

A hardware configuration of each of the communication relay devices 130 will be described with reference to FIG. 6. Each communication relay device 130 includes a CPU 130a, a memory 130b, a wireless communication circuit 130h, and a timer circuit 130j.

The CPU 130a performs processes based on an operating system (OS), a communication relay program, and other applications stored and held in the memory 130b. The memory 130b provides a work area for the CPU 130a. The memory 130b stores and holds programs such as an operating system (OS), a communication relay program, and programs of other applications, operation status information acquired from the trap operation status provider devices 110, time slot set time information (see FIG. 8), time slot assignment information (see FIG. 9), network architecture information (see FIG. 10), and operation status relay time information (see FIG. 12). The various types of data will be described later. The wireless communication circuit 130h transmits and receives (packet communication) data to and from the trap operation status provider devices 110, the trap operation status management device 120, and other communication relay devices 130. The timer circuit 130j generates a predetermined clock and measures a predetermined time. In the timer circuit 130i, an operation status acquisition time and a communication relay time, for example, are set as predetermined times. The operation status acquisition time and the communication relay time will be described later.

The communication relay program causes each of the communication relay devices 130 to receive operation status information from the trap operation status provider devices 110 and transmits the received information to the trap operation status management device 120. This program also causes the communication relay device 130 to receive operation status information of its lower-layer communication relay device 130 and perform relay transmission to its higher-layer communication relay device 130 or the trap operation status management device 120.

V. Communication Time Management in Trap Operation Status Management System 100

Communication time management used in the trap operation status management system 100 will be described with reference to FIG. 7. The trap operation status management system 100 employs a time slot system using communication management times called time slots, and the trap operation status management device 120 acquires operation status information from the trap operation status provider devices 110 by way of communication relay devices 130.

The time slot system manages a communication time necessary for each communication relay device 130 to communicate with other communication devices by assigning, to all the communication relay devices 130 belonging to the trap operation status management system 100, time slots obtained by dividing a predetermined operation status acquisition cycle time into predetermined lengths of time. The operation status acquisition cycle time here refers to an acquisition time period in which an operation status is repeatedly acquired from one communication relay device 130 in the trap operation status management system 100.

The trap operation status provider devices 110 and the communication relay devices 130 start up and come to be ready for communication when a communication time frame arrives, and in other time frames (e.g., when the communication time frame finishes), the trap operation status provider devices 110 and the communication relay devices 130 come to be in sleep states and do not perform communication. That is, the time slot system manages a communication time, and start-up and sleep of the trap operation status provider devices 110 and the communication relay devices 130 are repeatedly performed. In this embodiment, the trap operation status management device 120 is assumed to be after start-up.

In this embodiment, data of firmware transmitted is also transmitted from the trap operation status management device 120 to the trap operation status provider devices 110 by way of the communication relay devices 130. Thus, this data transmission is performed in communication time frames managed by the time slot system. Thus, communication time management by the trap operation status management system 100 will be first described in detail.

Figure 7:
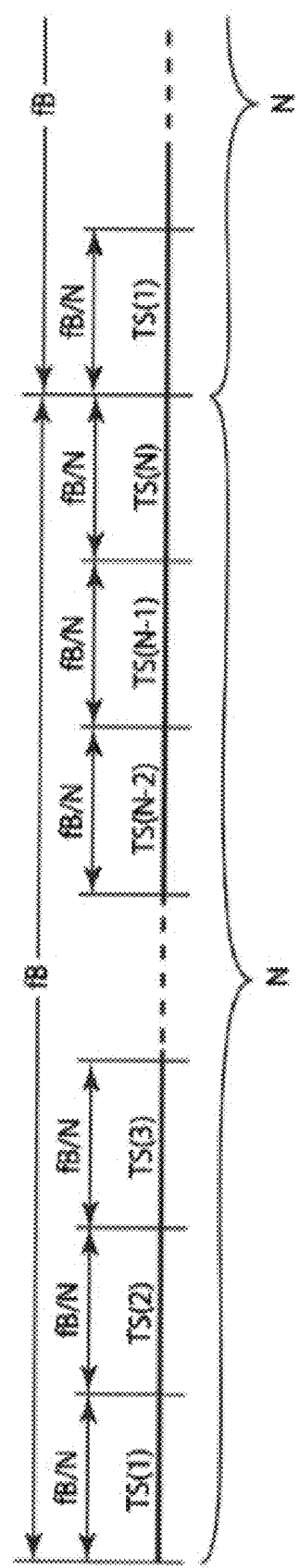
FIG. 7 is a diagram representing time slots.

As illustrated in FIG. 7, suppose an operation status acquisition cycle time fB is divided into a predetermined number N, the width TW of a time slot TS is fB/N. In general, N is set to be larger than the number of the communication relay devices 130 belonging to the trap operation status management system 100. The time slots TS are sequentially assigned with time slot numbers for specifying the individual time slots, in the order from the start of the operation status acquisition cycle time fB. In the following description, an N0-th time slot TS from the start of the operation status acquisition cycle time fB is represented as a time slot TS(N0).

The operation status acquisition cycle time fB is set at a time in which all the communication relay devices 130 belonging to the trap operation status management system 100 can be assigned with time slots TS having the widths TW, after the widths TW of the time slots TS are set. The widths TW of the time slots TS are determined in consideration of, for example, the number of trap operation status provider devices 110 belonging to one communication relay device 130, the number of communication relay devices 130 belonging to the trap operation status management system 100, and communication situations among devices.

A relationship between each time slot TS and a time range assigned with the time slot TS is described in the time slot set time information (see FIG. 8). The time slot TS are assigned to the respective communication relay devices 130. Relationships in assignment between the time slots TS and the communication relay devices 130 are described in the time slot assignment information (see FIG. 9).

VI. Data

Main data used in the trap operation status management system 100 will be described with reference to FIGS. 8 through 17.

1. Time Slot Set Time Information

The time slot set time information is information listing start times and end times of the time slots TS. The time slot set time information is provided to the communication relay devices 130 by the trap operation status management device 120, and is stored and held in the memories 130b by the communication relay devices 130.

FIG. 8 shows a data structure of the time slot set time information. The time slot set time information includes a slot number listing region, a start time listing region, and an end time listing region. In the slot number listing region, slot numbers of time slots TS set in the trap operation status management system 100 are listed. In the start time listing region, times at which the time slots TS specified by the respective slot numbers start are listed. In the end time listing region, times at which the time slots TS specified by the respective slot numbers end are listed. The times at which the time slots TS start and the times at which the time slots TS end are listed as elapsed times from the time at which the operation status acquisition cycle time fB starts.

For example, in the time slot set time information shown in FIG. 8, a time slot TS(3) of a slot number "3" indicates that the time slot starts "after 60 seconds" and ends "after 90 seconds" from the start of a certain operation status acquisition cycle time fB.

2. Time Slot Assignment Information

Time slot assignment information is information listing the communication relay devices 130 assigned to individual time slots. The time slot assignment information is provided to each of the communication relay devices 130 by the trap operation status management device 120, and is stored and held in the memories 130b by the communication relay devices 130.

FIG. 9 shows a data structure of the time slot assignment information. The time slot assignment information includes a slot number listing region and a process system constituent device ID listing region. In the slot number listing region, slot numbers set for the respective time slot TS in the trap operation status management system 100 are listed. In the process system constituent device ID listing region, process system constituent device IDs of the communication relay devices 130 assigned to the time slots TS specified by the slot numbers are listed. For example, FIG. 9 indicates that the communication relay device 130 with a process system constituent device ID "R2" is assigned to the time slot TS(3) with the slot number "3".

3. Network Architecture Information

Network architecture information is information listing a network architecture of the communication relay devices 130 belonging to the trap operation status management system 100. The network architecture information is provided to each of the communication relay devices 130 by the trap operation status management device 120, and is stored and held in the memories 130b by the communication relay devices 130.

FIG. 10 shows a data structure of the network architecture information. The network architecture information includes a lower-layer process system constituent device ID listing region and a higher-layer process system constituent device ID listing region. In the lower-layer process system constituent device ID listing region, a process system constituent device ID of one communication relay device 130 belonging to the trap operation status management system 100 is listed. In the higher-layer process system constituent device ID listing region, a process system constituent device ID of the communication relay device 130 located directly at a higher layer with respect to the communication relay device 130 corresponding to the process system constituent device ID listed in the lower-layer process system constituent device ID listing region.

Here, network architecture information will be described using a network architecture of the trap operation status management system 100 illustrated in FIG. 11 as an example. In the network architecture illustrated in FIG. 11, IDs specifying the devices are shown.

Figure 11:
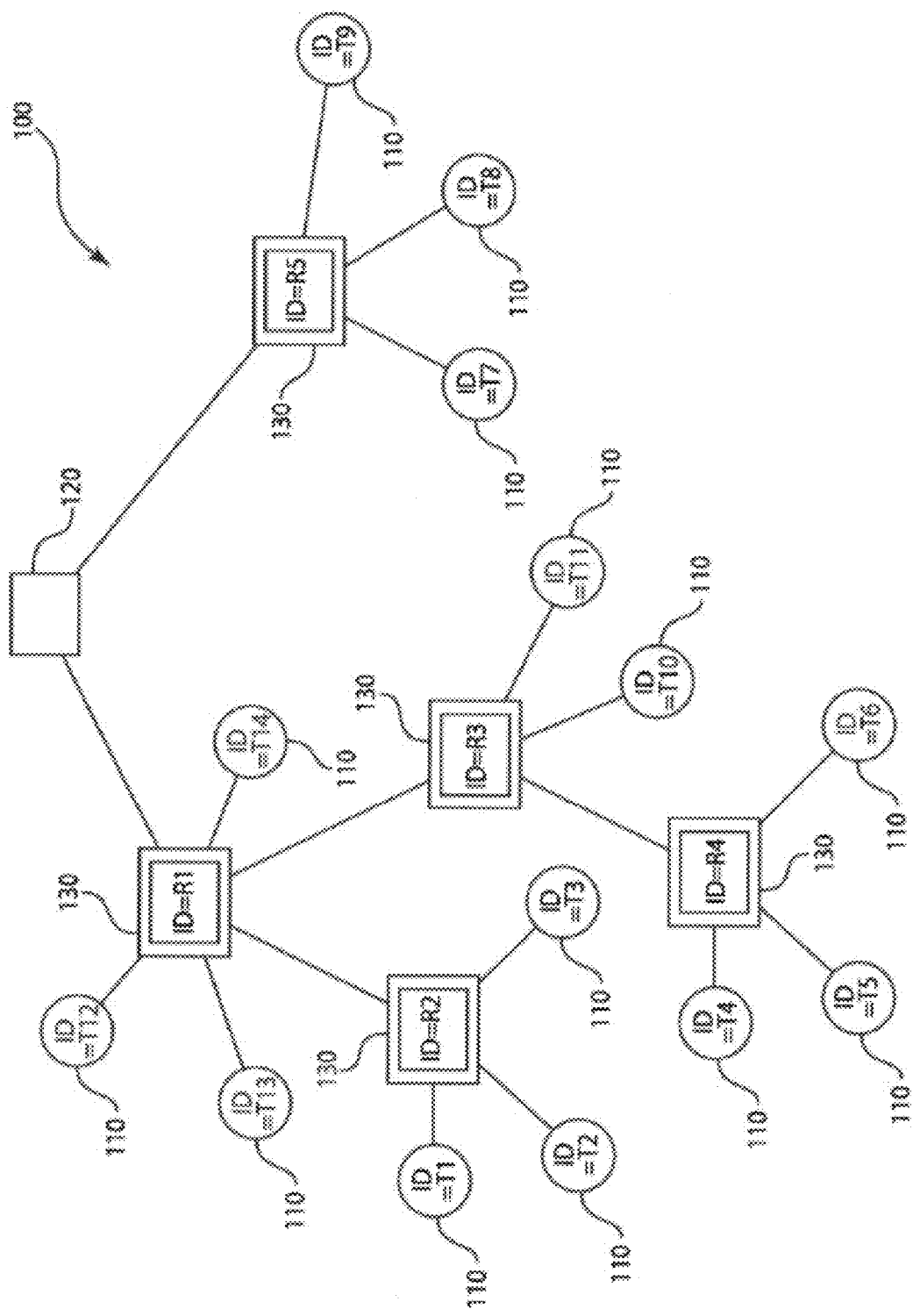
FIG. 11 is a diagram illustrating an example network architecture.

In the network architecture of the trap operation status management system 100 illustrated in FIG. 11, the communication relay device 130 with a process system constituent device ID "R4" is located directly at a lower layer with respect to the communication relay device 130 with the process system constituent device ID "R3". That is, the communication relay device 130 with the process system constituent device ID "R3" is present directly at a higher layer with respect to the communication relay device 130 with the process system constituent device ID "R4". Thus, as in the network architecture information shown in FIG. 10, "R3" is listed in the higher-layer process system constituent ID listing region in correspondence with "R4" in the lower-layer process system constituent ID listing region.

4. Operation Status Relay Time Information

Operation status relay time information is information indicating a time frame in which each trap operation status provider device 110 provides operation status information to one of the communication relay devices 130. The operation status relay time information is stored and held in the communication relay devices 130 and the memories 110b of the trap operation status provider devices 110.

FIG. 12 shows a data structure of the operation status relay time information. The operation status relay time information includes a process system constituent device ID listing region, a start time listing region, and an end time listing region. In the process system constituent device ID listing region, process system constituent device IDs set for the trap operation status provider devices 110 each directly at a lower layer of one of the communication relay devices 130 are listed. In the start time listing region, times at which the communication relay devices 130 start communication with the trap operation status provider devices 110 specified by the process system constituent device IDs are listed. In the end time listing region, times at which communication with the trap operation status provider devices 110 specified by the process system constituent device IDs end are listed. The times at which communication with the trap operation status provider devices 110 start and the times at which communication with the trap operation status provider devices 110 end are listed as elapsed times from starts of time slots TS of communication relay devices 130 with which the trap operation status provider devices 110 communicate, that is, communication relay devices 130 located directly at higher layers with respect to the trap operation status provider devices 110.

For example, the operation status relay time information shown in FIG. 12 indicates that the trap operation status provider device 110 with a process system constituent device ID "T5" starts after "0.5 seconds" and ends "after one second" from the start of a time slot TS(R4) of its directly higher-layer communication relay device 130 with the process system constituent device ID "R4" (see FIG. 11). The trap operation status provider device 110 is basically operating in a period from the start of communication to the end of communication, and is in a sleep state after a lapse of the end time of communication. In this communication, the communication relay devices 130 acquire operation status information by issuing, for example, transmission request for operation status information to the trap operation status provider devices 110.

The operation status relay time information illustrated in FIG. 12 is stored and held in the communication relay device 130 with the process system constituent device ID "R4" and the trap operation status provider devices 110 with the process system constituent device IDs "T4", "T5", and "T6". The trap operation status provider devices 110 with the process system constituent device IDs "T4", "T5", and "T6" transmit operation status information to the communication relay device 130 with the process system constituent device ID "R4". That is, the trap operation status provider devices 110 transmit operation status information to their directly higher-layer communication relay device 130. The other communication relay devices 130, for example, store operation status relay time information with different time setting.

5. Operation Status Information

Operation status information is information indicating operation statuses of steam traps T, such as temperature and vibrations, at a predetermined time point. The operation status information is acquired by the trap operation status provider devices 110 through the various sensors, and is stored and held by the memories 110b.

FIG. 13 shows a data structure of the operation status information. The operation status information includes an operation status type information listing region, an operation status value listing region, and an operation status value acquisition time point listing region. In the operation status type information listing region, the types of operation statuses are listed. In the operation status value listing region, sensor values of sensors used in acquiring operation statuses are listed. In the operation status value acquisition time point listing region, time points indicated by the timer circuits 110j when operation status values are acquired are listed.

6. Operation Status Information DB

The operation status information DB is information in which operation statuses of steam traps T belonging to the trap operation status management system 100 are accumulated. The operation status information DB is generated by the trap operation status management device 120 based on operation status information of the steam traps T acquired through the trap operation status provider devices 110, and is stored and held in the HDD 120c.

FIG. 14 shows a data structure of the operation status information DB. The operation status information DB includes a process system constituent device ID listing region, an operation status type information listing region, an operation status value listing region, an operation status value acquisition time point listing region, and a reception time point listing region. In the process system constituent device ID listing region, process system constituent device IDs each specifying one process system constituent device that has acquired operation status information are listed. In the operation status type information listing region and the operation status value listing region, information indicating the types of the acquired operation status information (see FIG. 13) and information indicating status values are respectively listed. In the operation status value acquisition time point listing region, information indicating operation status value acquisition time points of the acquired operation status information (see FIG. 13) are listed. In the reception time point listing region, times points indicated by the timer circuits 120*j* when the operation status information is received are listed.

7. Group Information

Group information is information indicating trap operation status provider devices 110 located directly at a lower layer of each communication relay device 130. That is, the group information is information indicating trap operation status provider devices 110 grouped with respect to each communication relay device 130. The group information is information for specifying the communication relay devices 130 and the trap operation status provider devices 110 that transmit operation status information. The group information is stored and held in the HDD 120*c* of the trap operation status management device 120.

FIG. 15 shows a data structure of the group information. The group information includes a higher-layer process system constituent device ID listing region and a lower-layer process system constituent device ID listing region. In the higher-layer process system constituent device ID (group ID) listing region, process system constituent device IDs of the communication relay devices 130 are listed. In the lower-layer process system constituent device ID (belonging device ID) listing region, process system constituent device IDs of the trap operation status provider devices 110 located directly at lower layers of the communication relay devices 130 corresponding to the process system constituent device IDs listed in the higher-layer process system constituent device ID listing region are listed.

For example, with respect to the group of the communication relay device 130 with the process system constituent device ID "R4" shown in FIG. 11, the trap operation status provider devices 110 with the process system constituent device IDs "T4", "T5", and "T6" are set.

The trap operation status management device 120 refers to the group information and causes the trap operation status provider devices 110 to update firmware in units of a group. Specifically, trap operation status provider devices 110 with IDs of T12 through T14 located directly at lower layers of the communication relay device 130 with the ID of R1 are defined as one group, and are caused to update firmware.

8. Data Transmission Progress Information

Data transmission progress information is information indicating progress status of firmware for each group based on the communication relay devices 130. The data transmission progress information is stored and held in the HDD 120*c* of the trap operation status management device 120.

FIG. 16 shows a data structure of the data transmission progress information. The data transmission progress information includes a higher-layer process system constituent device ID listing region, a status listing region, a transmitted address listing region, a responded device ID listing region, a reception status listing region, and a retransmission address listing region. In the manner similar to FIG. 15, in the higher-layer process system constituent device ID (group ID) listing region, process system constituent device IDs of the communication relay devices 130 are listed.

In the status listing region, current progress statuses of update of firmware corresponding to the group IDs are listed. Specifically, status=0 represents a state in which no progress is made. Status=1 represents a state in which preparation of firmware update is completed. Status=2 represents a state in which data transmission of update firmware is started. Status=3 represents a state in which data transmission is completed. Status=4 represents a state in which a reception status of transmitted data is being determined. Status=5 represents a state in which data of firmware that failed to be transmitted is being transmitted again. Status=6 represents a state in which transmission of data of firmware is completed and rewriting is completed. When status=6 is established for all the groups (group IDs), update of firmware is completed.

In the transmitted address listing region, addresses of data whose transmission is completed in the data constituting firmware are listed. In this embodiment, data of firmware is divided and transmitted in units of a predetermined size (e.g., 50 bytes) in the order from data at the starting address. An address of last data that has been already divided and transmitted is listed in the transmitted address listing region. Thus, in transmitting data of firmware next, the trap operation status management device 120 divides and transmits data at an address next to the addresses listed in this transmitted address listing region.

In the responded device ID listing region, process system constituent device IDs of trap operation status provider devices 110 that have responded to notification of start of firmware update to trap operation status provider devices 110 belonging to each group are listed. Only the trap operation status provider devices 110 that have responded are certified as trap operation status provider devices 110 as targets of update (transmission). In the reception status listing region, reception statuses (memory map) of individual trap operation status provider devices 110 (responded device IDs) as update targets are listed.

In the retransmission address listing region, addresses for specifying data of firmware to be retransmitted for the individual trap operation status provider devices 110 (responded device IDs) as update targets are listed. That is, addresses for specifying data (retransmission data) of firmware not received by the trap operation status provider devices 110 are listed. Addresses of retransmission data are specified based on the memory map.

9. Memory Map

A memory map is information indicating storage statuses of data of firmware stored in update data storage regions of the trap operation status provider devices 110. The memory map is stored and held in the memories 110*b* of the trap operation status provider devices 110.

Figure 17:
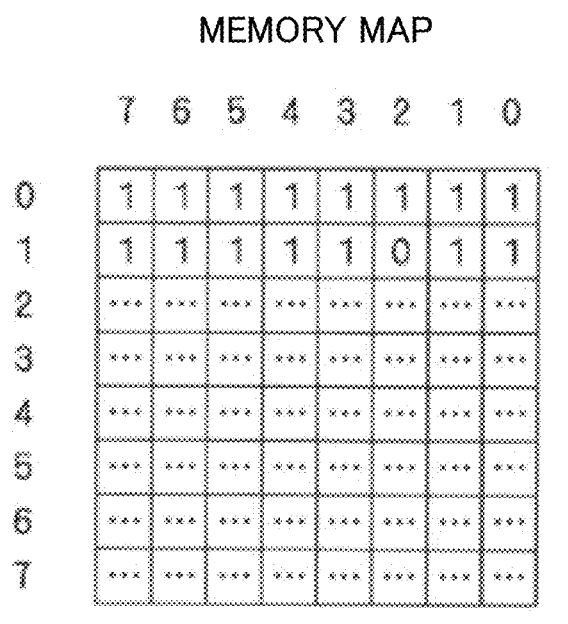

FIG. 17 shows a data structure of the memory map. The memory map has a size of, for example, 8 bytes, and stores a storage status of update firmware for every one bit. FIG. 17 shows a memory map using binary numbers in an 8×8 array structure. The right end represents a lowest-order bit, and the left end represents a highest-order bit. For example, in a case where firmware has a size of 64 kilobytes, a storage status of data of firmware corresponding to one kilobyte is stored for every one bit. In a bit 0 in the 0-th column, storage statuses of data from the starting address of firmware to a first kilobyte address are listed. Since "1" is listed as a numerical value in the bit 0 in the 0-th column, a state in which data from the starting address to the first kilobyte address is stored in a data update region is represented. In a bit 2 in the first column, "0" is listed as a numerical value, and thus, a state in which data in the corresponding address range is not stored in the data update region is represented.

VII. Operation of Trap Operation Status Management System 100

1. Operation of Communication Relay Device 130

(1) Operation Time Setting Process

With respect to each of the communication relay devices 130, in a case where no operation time is set in the timer circuit 130j, such as the communication relay device 130 itself starts first, or a case where the time slot set time information (see FIG. 8), the time slot assignment information (see FIG. 9), or the network architecture information (see FIG. 10) stored and held in the memory 130b is updated, the communication relay device 130 sets an operation time in the timer circuit 130j. The communication relay device 130 except for the timer circuit 130j is in the so-called sleep state in a time except a time set as an operation time.

Figure 18:
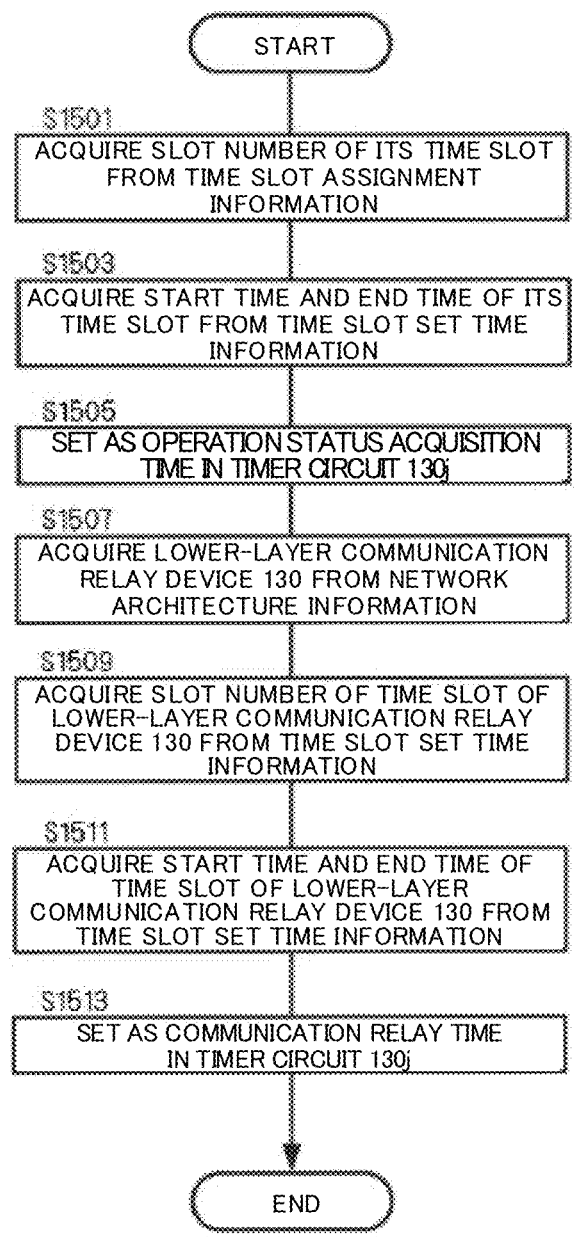
FIG. 18 is a flowchart depicting an operation time setting process.

The operation time setting process will be described with reference to the flowchart of FIG. 18. The CPU 130a of each communication relay device 130 acquires a slot number of its time slot TS from the time slot assignment information stored and held in the memory 130b (S1501). The CPU 130a acquires a start time and an end time of its time slot TS from the time slot time information stored and held in the memory 130b (S1503). The CPU 130a sets the acquired start time and end time in the timer circuit 130j as operation status acquisition times (S1505).

The CPU 130a acquires communication relay devices 130 at lower-layers with respect to the current communication relay device 130 itself, from the network architecture information (S1507). Specifically, the CPU 130a extracts a process system constituent device ID of itself from the higher-layer process system constituent device ID listing region of the network architecture information, and acquires corresponding process system constituent device IDs in the lower-layer process system constituent device ID listing region. The CPU 130a extracts the acquired process system constituent device IDs from the higher-layer process system constituent device ID listing region of the network architecture information, and acquires corresponding process system constituent device IDs in the lower-layer process system constituent device ID listing region. The CPU 130a repeats the foregoing operation until the acquired process system constituent device IDs are not present any more in the higher-layer process system constituent device ID listing region of the network architecture information. If the process system constituent device ID of itself is not present in the higher-layer process system constituent device ID listing region of the network architecture information, this indicates that the current communication relay device 130 is at the bottom end of the network.

The CPU 130a acquires slot numbers of time slots TS of communication relay devices 130 at lower layers with respect to the current communication relay device 130, from slot assignment information stored and held in the memory 130b (S1509). The CPU 130a acquires start times and end times of time slots TS of the communication relay devices 130 at lower layers with respect to the current communication relay device 130, from the time slot set time information stored and held in the memory 130b (S1511). The CPU 130a sets the acquired start times and end times in the timer circuit 130j as communication relay times (S1513).

First Specific Example

Here, in the network architecture illustrated in FIG. 11, an operation time setting process will be described using an example in which the time slot set time information, the time slot assignment information, and the network architecture information are those shown in FIGS. 8, 9, and 10, respectively. In an operation time setting process for the process system constituent device ID of the process system constituent device ID "R3", the CPU 130a acquires a slot number "4" of its time slot TS from the slot assignment information. The CPU 130a then acquires a start time "90" and an end time "120" of the slot number "4" from the time slot set time information as operation status acquisition times, and sets these times in the timer circuit 130j.

Thereafter, the CPU 130a acquires a value "R4" from the lower-layer process system constituent device ID listing region corresponding to a value "R3" in the higher-layer process system constituent device ID listing region of the network architecture information, and acquires a slot number "5" of a time slot TS corresponding to the acquired process system constituent device ID "R4" from the slot assignment information. Subsequently, the CPU 130a acquires a start time "120" and an end time "150" of the slot number "5" from the time slot set time information, and sets the acquired start time and end time in the timer circuit 130j as a communication relay time.

In an operation time setting process for the process system constituent device ID of the process system constituent device ID "R4", the CPU 130a acquires the slot number "5" of its time slot TS from the slot assignment information. The CPU 130a then acquires the start time "120" and the end time "150" of the slot number "5" from the time slot set time information, and sets the acquired start time and end time in the timer circuit 130j as an operation status acquisition time.

On the other hand, since the value of the lower-layer process system constituent device ID listing region corresponding to the value "R4" in the higher-layer process system constituent device ID listing region of the network architecture information is not present, the CPU 130a determines that the communication relay device 130 to which the CPU 130a itself belongs is the bottom-end communication relay device 130, and does not set a communication relay time in the timer circuit 130j.

(2) Operation Status Acquisition Transmission Process

An operation status acquisition transmission process is a process which is executed by the communication relay devices 130, and in which one of the communication relay devices 130 acquires operation status information from the trap operation status provider device 110 located at a lower layer of the communication relay device 130 and directly communicating with the communication relay device 130, and transmits the acquired operation status information to the trap operation status management device 120. In the trap operation status management system 100, each communication relay device 130 acquires operation status information from the trap operation status provider device 110 and transmits the acquired operation status information to the trap operation status management device 120 within a time of its time slot TS.

Figure 19:
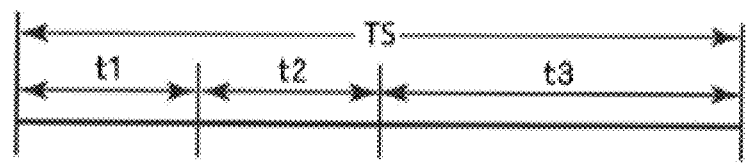
FIG. 19 is a diagram representing time slots.

FIG. 19 shows time assignment to processes in a time slot TS. One of the communication relay devices 130 acquires operation status information in a period t1 after start of the time slot TS, from the trap operation status provider device 110 which is located at a lower layer with respect to this communication relay device 130 and with which the communication relay device 130 can directly communicate. This communication relay device 130 transmits the acquired operation status information to the trap operation status management device 120 in a period t2 following the period t1. A period t3 subsequent to the period t1 and the period t2 is assigned as a stand-by period, and is used as appropriate.

Figure 20:
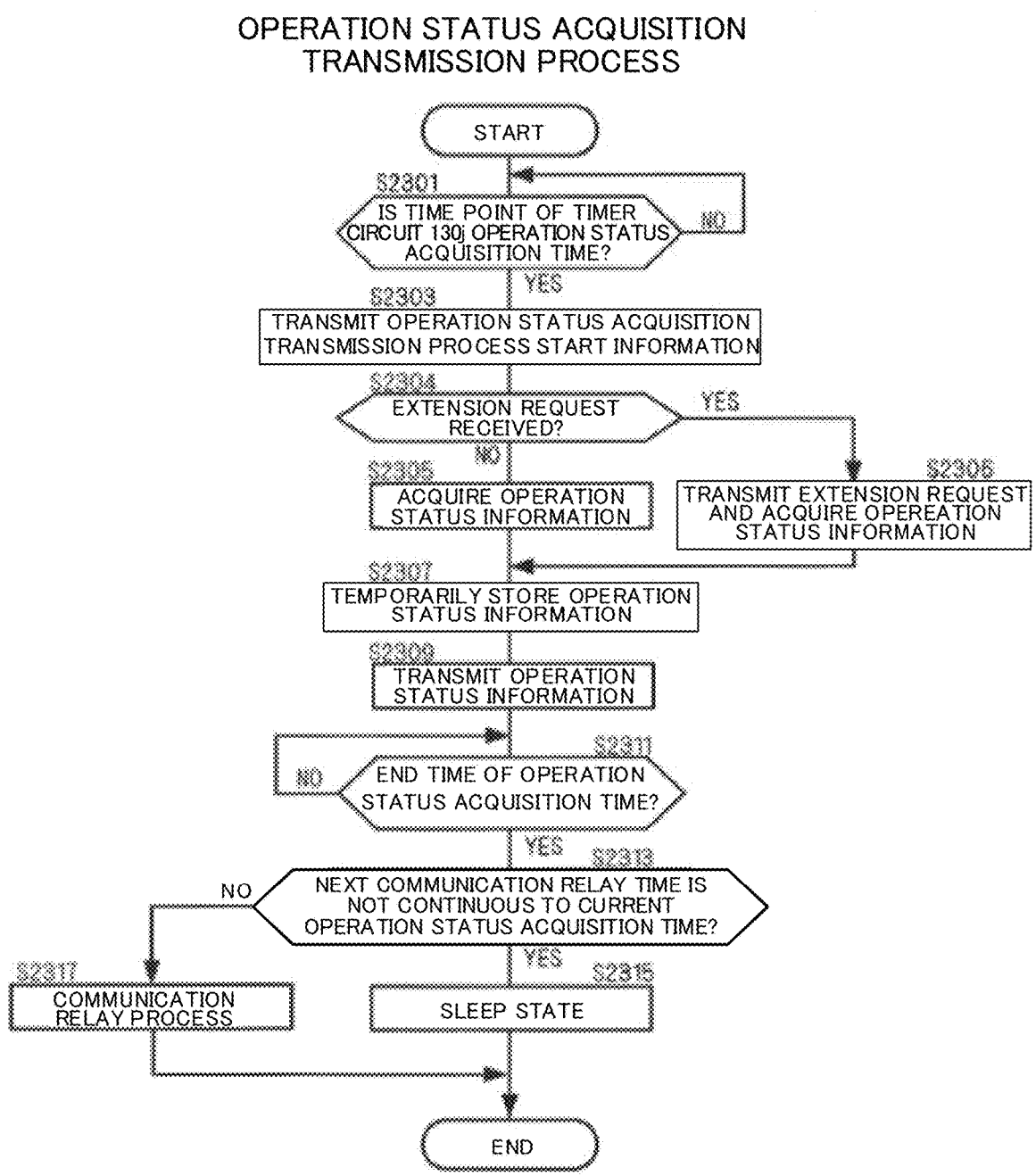
FIG. 20 is a flowchart depicting an operation status acquisition transmission process of the communication relay device.

An operation of each communication relay device 130 in the operation status acquisition transmission process will be described with reference to the flowchart of FIG. 20. The communication relay device 130 uses the timer circuit 130j to measure a time from the start of the operation status acquisition cycle time fB in a current cycle.

If the timer circuit 130j of the communication relay device 130 determines that the measured time reaches an operation status acquisition time (S2301), the timer circuit 130j transmits operation status acquisition transmission process start information to the CPU 130a (S2303). That is, a state in which the period t1 in the time slot TS has started is indicated. In a case where the CPU 130a of the communication relay device 130 is in the sleep state, the timer circuit 130j activates the CPU 130a.

Next, the CPU 130a determines whether an extension request from the trap operation status management device 120 is received or not (step S2304). The extension request is information for extending an operating time in next activation of the trap operation status provider device 110 which is located at a lower layer with respect to the current communication relay device 130 and which the communication relay device 130 can directly communicate. The trap operation status provider device 110 operates from the start time to the end time set as illustrated in FIG. 12 and then becomes in the sleep state and does not perform communication in the period t1 in the time slot TS. This extension extends the end time to the end time of the period t3 of the time slot TS. The extension request is information that is transmitted for update of firmware. This will be described in detail later.

If it is determined that no extension request is not received at S2304, the CPU 130a acquires operation status information from the trap operation status provider device 110 which is located at a lower layer with respect to the current communication relay device 130 and with which the communication relay device 130 can directly communicate (S2305). More specifically, the CPU 130a starts measuring time with the timer circuit 130j, and sequentially transmits transmission requests of operation status information to the trap operation status provider devices 110, with reference to the measured time and the start time and the end time of the operation status relay time information (see FIG. 12). Before the end of the period t1 of the time slot TS, operation status information is acquired from each of the trap operation status provider devices 110.

On the other hand, if the CPU 130a determines that an extension request is received in S2304, the CPU 130a issues an extension request to, and acquires operation status information from, the trap operation status provider device 110 which is located at a lower layer with respect to the current communication relay device 130 and which can directly communicate with the communication relay device 130 (S2306). More specifically, in a manner similar to S2305, the CPU 130a starts measuring time with the timer circuit 130j, and sequentially transmits extension requests and transmission requests of operation status information to the trap operation status provider devices 110, with reference to the measured time and the start time and the end time of the operation status relay time information (see FIG. 12).

Thereafter, the CPU 130a temporarily stores and holds the received operation status information in the memory 130b together with the received time point in association with the trap operation status provider device 110 that transmitted the received operation status information (S2307). The CPU 130a then transmits the operation status information temporarily stored and held in the memory 130b to the trap operation status management device 120 in the period t2 after the end of the period t1 of the time slot TS (S2309).

Figure 21:
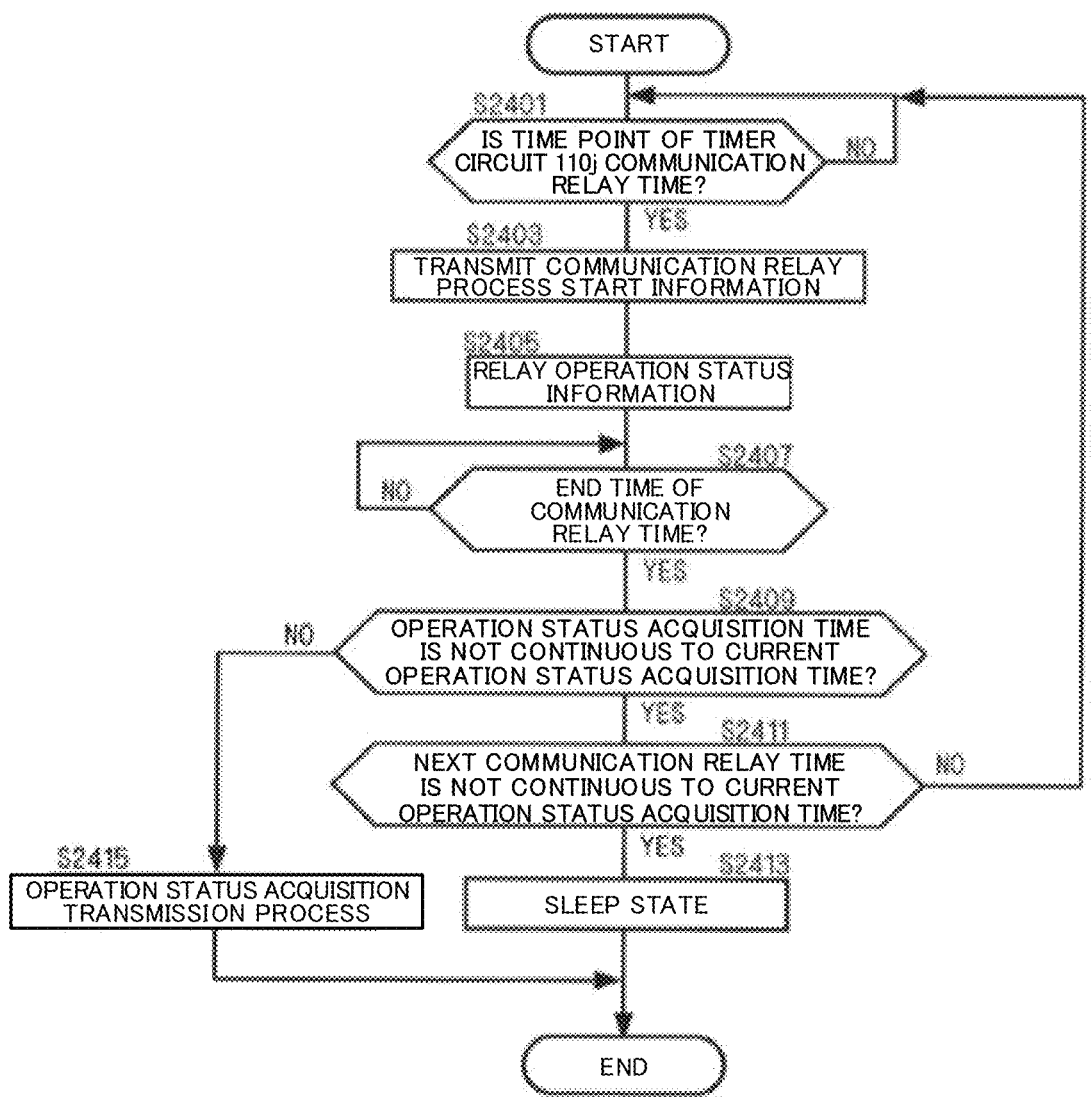
FIG. 21 is a flowchart depicting a communication relay process.

If the CPU 130a determines that the end time of the operation status acquisition time (period t3 of the time slot TS) arrives (S2311), as long as the start time of the next communication relay time is not continuous to the current operation status acquisition time (S2313), the CPU 130a changes to the sleep state except for the timer circuit 130j (S2315). On the other hand, if the start time of the next communication relay time is continuous to the current operation status acquisition time, the communication relay process (described later: see FIG. 21) is executed (S2317).

(3) Communication Relay Process

The communication relay process is a process in which when one of the communication relay devices 130 transmits operation status information to the trap operation status management device 120 using the time slot system, another communication relay device 130 on a communication path from the former communication relay device 130 to the trap operation status management device 120 relays transmission of the operation status information. The communication relay process will be described with reference to the flowchart of FIG. 21.

If the timer circuit 130j of each communication relay device 130 determines that the measured time reaches a start time of the communication relay time (S2401), the timer circuit 130j transmits communication relay process start information to the CPU 130a (S2403). In a case where the CPU 130a of the communication relay device 130 is in the sleep state, the timer circuit 130j activates the CPU 130a.

The CPU 130a transmits (relays) operation status information acquired through the wireless communication circuit 110h to its higher-layer communication relay device 130 (S2405). When the CPU 130a determines that the end time of the communication relay time arrives (S2407), if the start time of the operation status acquisition time is not continuous to the current communication relay time (S2409) and the start time of the next communication relay time is not continuous to the current communication relay time (S2411), the CPU 130a changes to the sleep state except for the timer circuit 130j (S2413).

On the other hand, in step S2409, if the start time of the operation status acquisition time is continuous to the current communication relay time, the CPU 130a performs an operation status acquisition transmission process (see FIG. 20) (S2415). In step S2411, if the start time of the next communication relay time is continuous to the current communication relay time, the CPU 130a repeats step S2401 and processes after step S2401.

As described above, each communication relay device 130 is in an operating state in the operation status acquisition time and the communication relay time, and is in the sleep state in the other time. For example, if the communication relay device 130 with the system constituent device ID "R2" shown in FIG. 11 is in the operation status acquisition time, the communication relay device 130 with the system constituent device ID "R1" is in the communication relay time and in the operating state. The trap operation status provider devices 110 with the system constituent device IDs "T1", "T2", and "T3" located directly at a lower layer with respect to the communication relay device 130 with the system constituent device ID "R2" is in the operating state from the start time to the end time based on the operation status relay time information.

2. Operation of Trap Operation Status Provider Device 110

Figure 22:
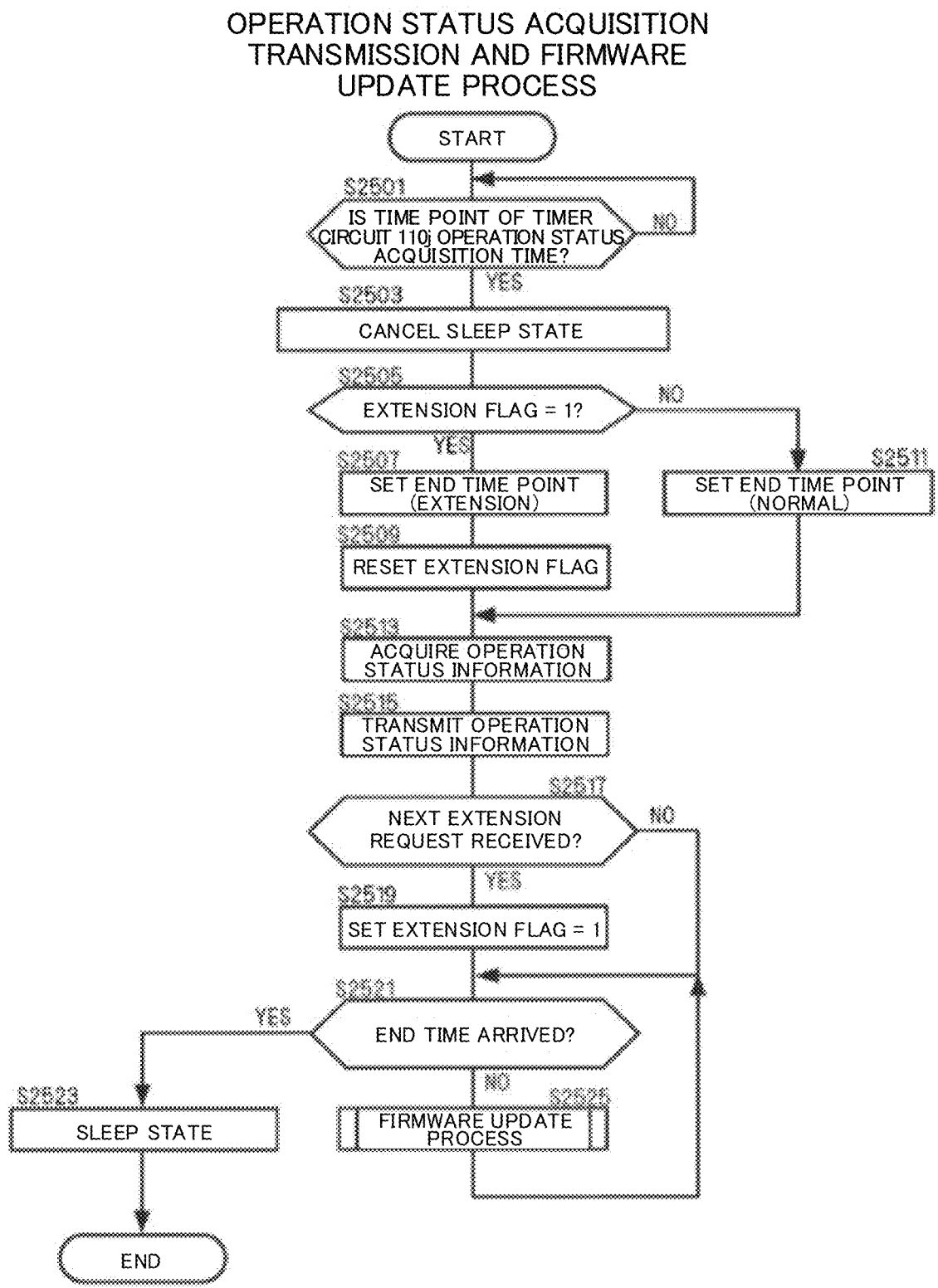
FIG. 22 is a flowchart depicting an operation status acquisition transmission process of the trap operation status provider device.

Operations of the trap operation status provider device 110 in the operation status acquisition transmission process will be described with reference to the flowchart of FIG. 22. Each trap operation status provider device 110 uses the timer circuit 110j to measure a time before next operation status information is transmitted to the communication relay device 130.

The trap operation status provider device 110 is in the operating state from the start time to the end time in the operation status relay time information as described above. Then, after the trap operation status provider device 110 transmits operation status information to the communication relay device 130, predetermined circuits including the CPU 110a and the wireless communication circuit 110h except the timer circuit 110j are changed to sleep states. In a case where an extension request is issued, the operating time is extended from the end time to the period t3 of the time slot TS, and then the predetermined circuits are changed to the sleep state.

In this embodiment, if the end time is not extended, only an acquisition transmission process of operation status information is performed, whereas if the end time is extended, an acquisition transmission process of operation status information and an update process of firmware are performed.

If the timer circuit 110j of the trap operation status provider device 110 determines that the measured time reaches the time at which operation status information is to be transmitted to the communication relay device 130 (S2501), the timer circuit 110j activates the sleep-state CPU 110a (S2503). Next, the CPU 110a determines whether extension flag=1 or not (S2505). If extension flag=1, the CPU 110a sets the end time at an extended time (end time of the period t3) (S2507), and resets the extension flag (sets the extension flag=0) (S2509). The extension flag is a variable used for determining whether the operating time of the trap operation status provider device 110 is extended or not, and is set at 1 (extended) or 0 (not extended). As an initial value, the extension flag is set at 0. If an extension request is transmitted from the trap operation status management device 120, the extension flag is set at 1. On the other hand, if extension flag=0, the CPU 110a sets the end time at the end time of the operation status relay time information (S2511).

Subsequently, the CPU 110a acquires operation status information from various sensors such as a temperature sensor and a vibration sensor through the sensor communication circuit 110i (S2513). The CPU 110a then transmits the acquired operation status information in response to a transmission request of operation status information of its higher-layer communication relay device 130 (S2515). Thereafter, the CPU 110a determines whether an extension request in next activation from the higher-layer communication relay device 130 is received or not (S2517). Specifically, it is determined whether extension request information is received from the higher-layer communication relay device 130 together with the transmission request of the operation status information or not. If the extension request is received, the CPU 110a sets extension flag=1 (S2519), and proceeds to a process in S2521. In this manner, the end time (operating time) in next activation of the trap operation status provider device 110 is extended to the period t3.

On the other hand, if the extension request is not received, the CPU 110a determines whether an end time point has arrived or not (S2521). If the end time point has arrived, the CPU 110a changes predetermined circuits including the CPU 110a itself to sleep states (S2523). Before the change to the sleep state, the CPU 110a acquires a time before transmission of next operation status information to a higher-layer communication relay device 130 from the higher-layer communication relay device 130, and sets the acquired time in the timer circuit 110j.

On the other hand, if the end time point has not arrived because of extension of the end time, the CPU 110a executes a firmware update process (see FIG. 23) (S2525). The firmware update process will be described later.

3. Operation of Trap Operation Status Management Device 120

The trap operation status management device 120 receives operation status information from each trap operation status provider device 110 by the operation status acquisition transmission process described above, and updates the operation status information DB shown in FIG. 14. In a case where the trap operation status provider devices 110 need to update firmware, a firmware transmission process is performed. As described above, firmware is updated in a time (communication time frame) in which the trap operation status provider devices 110 of each group are operating based on the group information and information concerning communication time frames (the time slot set time information, the time slot assignment information, and the network architecture information).

Figure 24:
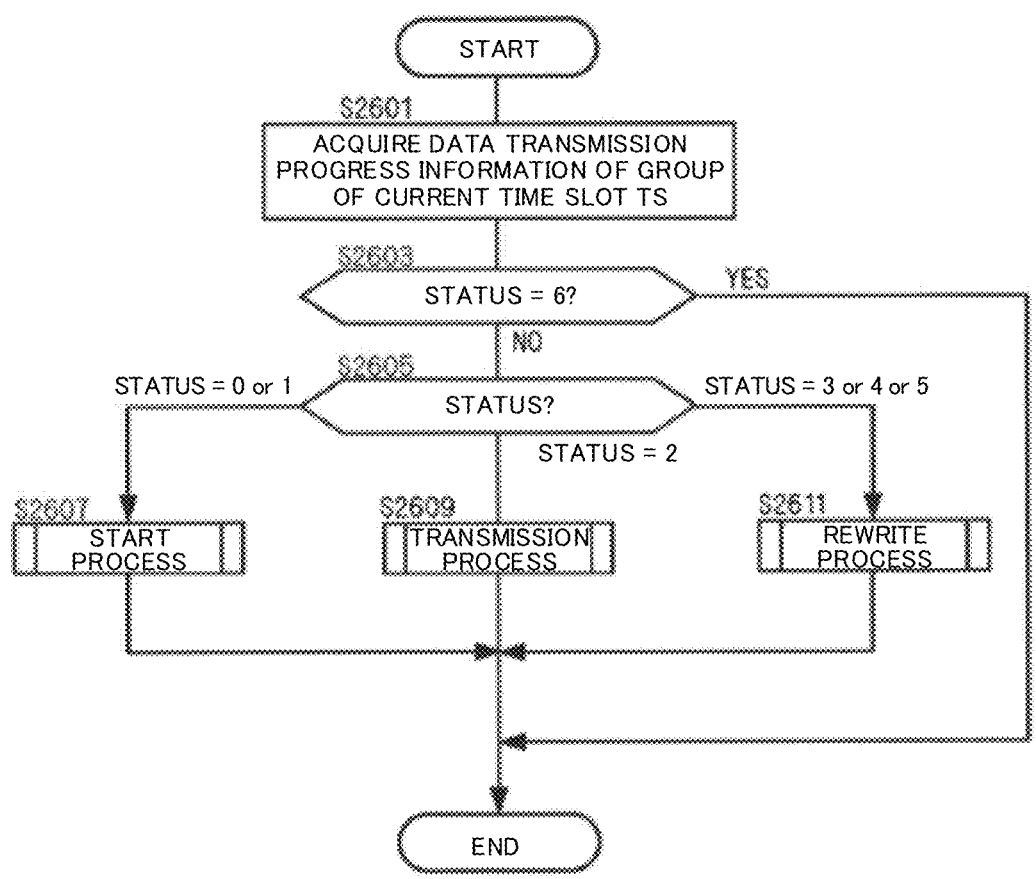
FIG. 24 is a flowchart depicting a firmware transmission process of a trap operation status management device.

An operation of the trap operation status management device 120 in the firmware transmission process will be described with reference to the flowchart of FIG. 24. The trap operation status management device 120 uses the timer circuit 120j to measure a time from the start of the operation status acquisition cycle time fB in a current cycle. The firmware transmission process starts when an operator operates the keyboard 120d and inputs an instruction to perform firmware update, and is finished when update (rewriting) of firmware of all the trap operation status provider devices 110 that have responded is completed. The firmware transmission process shown in FIG. 24 is repeatedly performed in a regular cycle (e.g., 10 milliseconds).

The CPU 120a specifies the communication relay device 130 (group) of the current time slot TS with reference to, for example, the time slot set time information, the time slot assignment information, and the group information, and acquires data transmission progress information of this group (S2601). Thereafter, the CPU 120a determines whether the status of the group=6 (completion of update) or not (S2603). If status=6, since rewriting of the currently activated (operating) group is completed, the CPU 120a finishes this process.

On the other hand, if the status≠6, the CPU 120a proceeds to any one of a start process (S2607), a transmission process (S2609), and a rewrite process (S2611) in accordance with the status (S2605).

Figure 25:
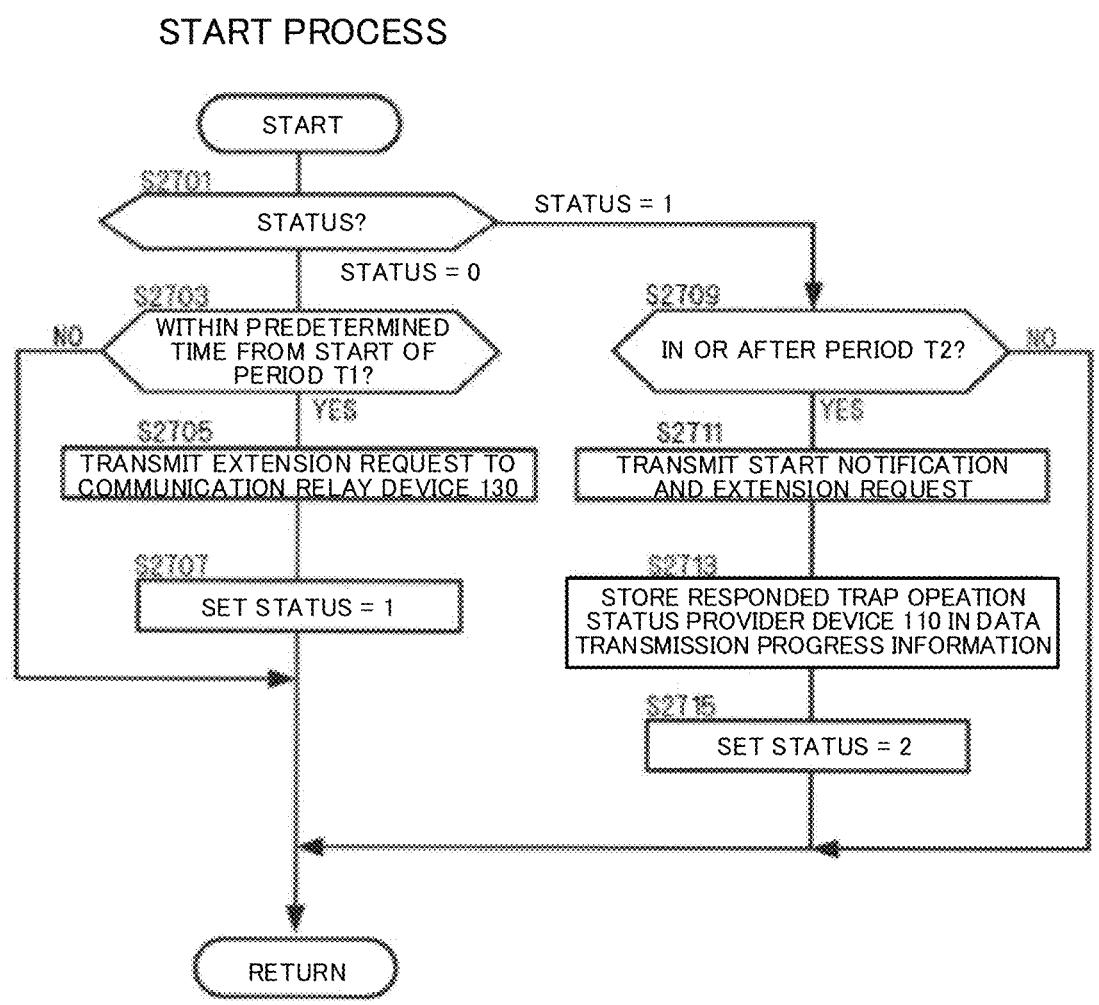
FIG. 25 is a flowchart depicting a start process of the trap operation status management device.

If status=0 or 1, the CPU 120a executes the start process (S2607). FIG. 25 is a flowchart of a subroutine depicting the start process in S2607. The start process is a process for transmitting, for example, start notification of transmission of update firmware to the trap operation status provider devices 110 in the group. If it is determined that status=0 (no progress) in S2701, the CPU 120a determines whether the current time is within a predetermined time from the start of the period t1 of the current time slot TS or not (S2703). The predetermined time is set at a time before the communication relay device 130 of the group issues a transmission request of operation status information to the trap operation status provider devices 110 in the period t1. This is performed for the purpose of determining whether the current time is in a time frame in which an extension request to the trap operation status provider devices 110 by way of the communication relay device 130 in S2705 can be performed or not in S2703.

The extension request is transmitted from trap operation status management device 120 (CPU 120a) to the communication relay device 130 in S2705. Then, the communication relay device 130 that has received the extension request issues an extension request together with a transmission request of operation status information to the trap operation status provider devices 110 in the period t1 as described for steps S2304 and S2306 in FIG. 20. For this reason, the trap operation status management device 120 (CPU 120a) needs to issue an extension request before the communication relay device 130 issues a transmission request of operation status information in the period t1 (within a predetermined time in the period t1).

If the current time is within the predetermined time from the start of the period t1, the CPU 120a transmits an extension request by unicast to the communication relay device 130 of the group (S2705). In S2306 shown in FIG. 20, the communication relay device 130 that has received the extension request issues an extension request of an operating time in next activation together with a transmission request of operation status information to the trap operation status provider devices 110 belonging to the group. Subsequently, the CPU 120a updates the status from "0" (no progress) to "1" (completion of update preparation) (S2707), and finishes the start process. On the other hand, if the CPU 120a determines that the predetermined time has elapsed from the start of the period t1 in S2703, the CPU 120a finishes the start process.

If the CPU 120a determines that status=1 (completion of update preparation) in S2701, the CPU 120a determines whether or not the current time slot TS is in or after the period t2 (S2709). This is because communication with the trap operation status provider devices 110 concerning firmware update is performed in the periods t2 and t3 in this embodiment. If the CPU 120a determines that the current time slot TS is in or after the period t2, the CPU 120a transmits start notification of firmware transmission and an extension request of an operating time in next activation by unicast to each of the trap operation status provider devices 110 belonging to the group (S2711).

Subsequently, the CPU 120a writes trap operation status provider devices 110 that have responded to the start notification in the responded device ID listing region of the corresponding group in the data transmission progress information of FIG. 16 (S2713). The CPU 120a then updates the status from "1" (completion of update preparation) to "2" (transmission start) (S2715), and finishes the start process. If the CPU 120a determines that the current time slot TS is neither in nor after the period t2 in S2709, the CPU 120a finishes the start process.

Figure 26:
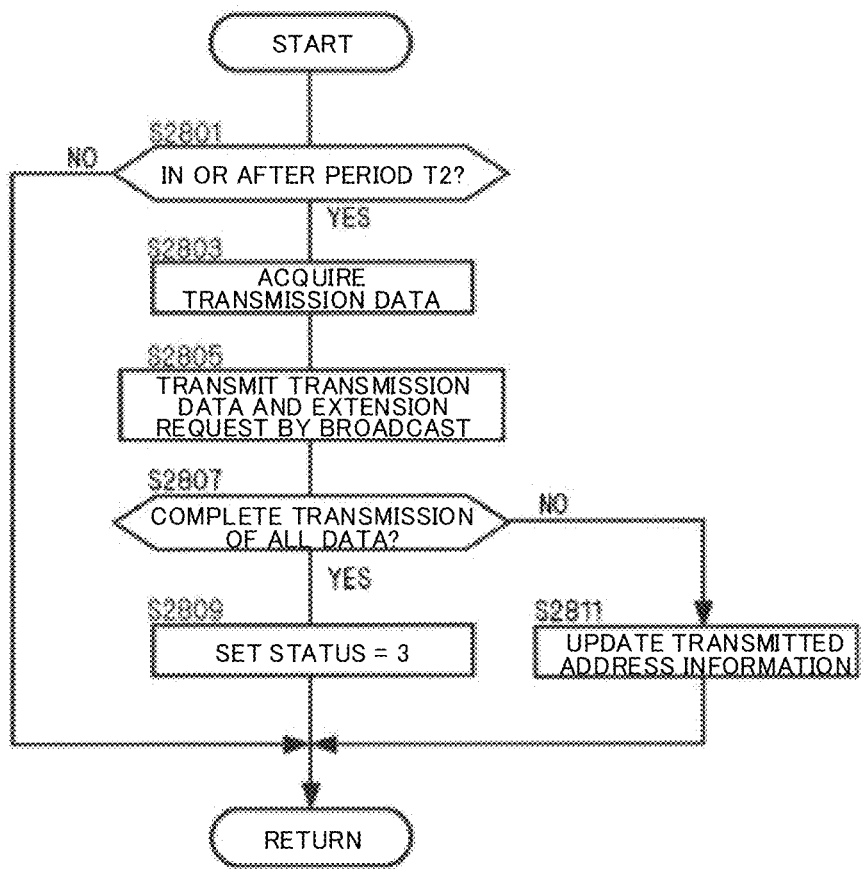
FIG. 26 is a flowchart depicting a transmission process of the trap operation status management device.

With reference back to FIG. 24, if status=2 (transmission start) in S2603, the CPU 120a executes a transmission process (S2609). FIG. 26 is a flowchart of a subroutine depicting the transmission process of S2609. The transmission process is a process for dividing and transmitting update firmware by broadcast in accordance with a transmission status of firmware of the group.

The CPU 120a determines whether the current time slot TS is in or after the period t2 or not (S2801). If the current time slot TS is neither in nor after the period t2, the CPU 120a finishes the transmission process. As described above, this is because communication with the trap operation status provider devices 110 regarding firmware update is performed in the periods t2 and t3 in this embodiment. On the other hand, if the current time slot TS is in or after the period t2, the CPU 120a acquires data of a part of firmware to be next divided and transmitted based on transmitted address information of the corresponding group of the data transmission progress information (S2803), and transmits the acquired data by broadcast together with address information and an extension request of an operating time in next activation (S2805). Therefore, each trap operation status provider device 110 that has received the start notification in the group stores the received data in the update data storage region based on the address information.

Thereafter, the CPU 120a determines whether transmission of all the data of update firmware (data of the final address) is completed or not (S2807). If the transmission is completed, the CPU 120a updates the status from "2" (transmission start) to "3" (completion of transmission) (S2809), and finishes the transmission process. On the other hand, if the transmission is not completed, the CPU 120a updates the transmitted address information of the data transmission progress information in the group to address information for specifying divided data transmitted in S2805 (S2811), and finishes the transmission process.

Figure 27:
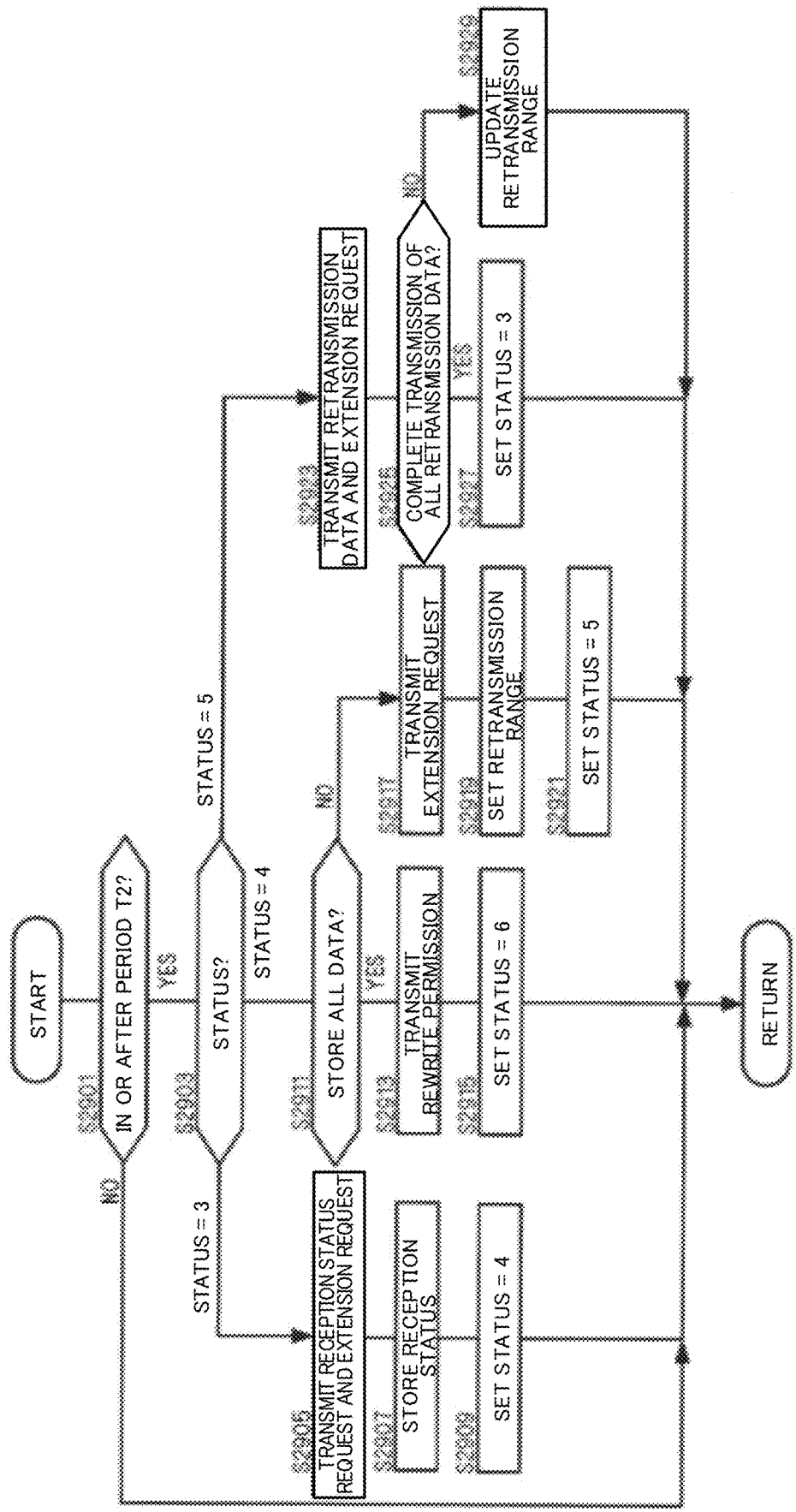
FIG. 27 is a flowchart depicting a rewrite process of the trap operation status management device.

Next, with reference back to FIG. 24, if status=3 (completion of transmission), 4 (under determination) or 5 (under retransmission) in S2603, the CPU 120a executes the rewrite process (S2611). FIG. 27 is a flowchart of a subroutine depicting the rewrite process in S2611. The rewrite process is a process in which it is determined whether or not all the data of update firmware is received by trap operation status provider devices 110 in the group that have responded to the start notification, and if all the data is not received, the data is transmitted again, and if all the data is received, a rewrite process of the firmware is caused to be executed.

The CPU 120a determines whether the current time slot TS is in or after the period t2 or not (S2901). As described above, this is because communication with the trap operation status provider devices 110 regarding firmware update is performed in the periods t2 and t3 in this embodiment. If the current time slot TS is neither in nor after the period t2, the CPU 120a finishes the transmission process. On the other hand, if the current time slot TS is in or after the period t2, the CPU 120a determines to which one of the processes of S2905, S2911, and S2923 the process proceeds, based on the status (S2903).

If status=3 (completion of transmission), the CPU 120a transmits, by unicast, a transmission request of a reception status (memory map) to each of the trap operation status provider devices 110 (responded device IDs) that have responded to the start notification, together with the extension request of an operating time in next activation (S2905). Thereafter, the CPU 120a stores the received memory map in the reception status listing region in correspondence with the responded device IDs (S2907). The CPU 120a than updates the status from "3" (completion of transmission) to "4" (under determination) (S2909), and finishes a rewrite process.

Subsequently, the process returns to S2903, and if status=4 (under determination), based on the memory map of each of the trap operation status provider devices 110 (responded device IDs) of the group that have responded to the start notification, the CPU 120a determines whether all the data of firmware is recorded in each trap operation status provider device 110 or not (S2911). If the CPU 120a determines that all the data of the firmware is recorded, the CPU 120a transmits the rewrite permission to each of the trap operation status provider devices 110 by unicast (S2913). Thereafter, the CPU 120a updates the status from "4" (under determination) to "6" (completion of update) (S2915), and finishes the rewrite process.

On the other hand, if the CPU 120a determines that all the data of the firmware is not recorded, the CPU 120a transmits an extension request of an operating time in next activation to the trap operation status provider devices 110 by unicast (S2917). Subsequently, the CPU 120a stores address information indicating divided data to be retransmitted in the firmware, in the retransmission address information listing region of each of the trap operation status provider devices 110 (responded device IDs) (S2919). That is, a retransmission range is set. Then, the CPU 120a updates the status from "4" (under determination) to "5" (under retransmission) (S2921), and finishes the rewrite process.

Thereafter, the process returns to S2903, and if status=5 (under retransmission), the CPU 120a transmits, by unicast, divided data of the firmware based on the retransmission address information to the trap operation status provider devices 110 with responded device IDs in the group in the data transmission progress information, together with the address information and the extension request of the operating time in next activation (S2923).

The CPU 120a then determines whether transmission of all the data of the retransmission data is completed or not (S2925). If the retransmission of all the data is completed, the CPU 120a updates the status from "5" (under retransmission) to "3" (completion of transmission) (S2927), and finishes the rewrite process. The status is updated to "3" (completion of transmission) in order to determine whether it is possible to receive the retransmitted memory map and transmit rewrite permission. Alternatively, after completion of transmission of all the data to be retransmitted, rewrite permission may be transmitted.

On the other hand, if retransmission is not completed, the CPU 120a updates the retransmission address information listing region (i.e., sets a retransmission range) so as to remove address information of data transmitted in S2923 (S2929), and finishes the rewrite process.

4. Operation of Trap Operation Status Provider Device 110 (Firmware Update Process)

Figure 23:
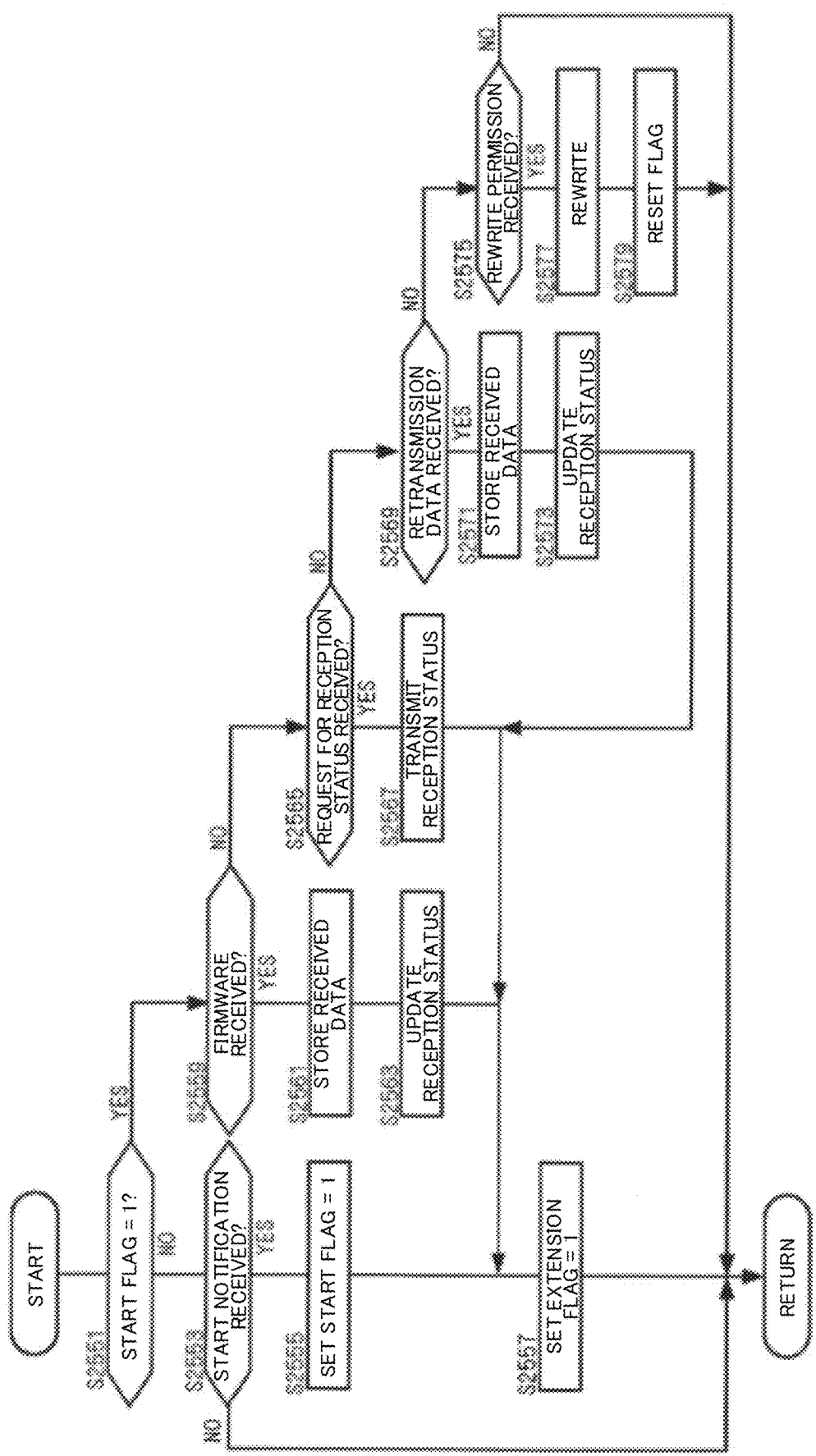
FIG. 23 is a flowchart depicting a firmware update process of the trap operation status provider device.

Next, operation status acquisition transmission and a firmware update process in S2525 in a firmware update process shown in FIG. 22 of each trap operation status provider device 110 will be described. FIG. 23 is a flowchart of a subroutine depicting the firmware update process in S2525. As shown in FIG. 22, the firmware update process is performed after transmission of operation status information, and is repeatedly performed until the end time point arrives at S2521 and the device changes to the sleep state (S2523).

The CPU 130a determines whether stat flag=1 or not (step S2551). The start flag is a variable used for specifying whether start notification of firmware update is received from the trap operation status management device 120 or not, and is set at any one of 1 (received) or 0 (not received). As an initial value, the start flag is set at 0. It is determined whether to update firmware or not depending on the value of the start flag. Specifically, if the start notification is not received, data is not received even in a case where data of firmware is transmitted from the trap operation status management device 120 by broadcast.

If the CPU 130a determines start flag≠1 in S2551, the CPU 130a considers that the start notification has not been received from the trap operation status management device 120, and determines whether or not start notification of itself is received from the trap operation status management device 120 by unicast (S2553). If the start notification is not received, the CPU 130a finishes the firmware update process. On the other hand, if the start notification is received, the CPU 130a updates the start flag from "0" to "1" (S2555), and sets extension flag=1 (S2557). Then, the firmware update process is finished.

If the CPU 130a determines that start flag=1 in S2551, the CPU 130a determines whether or not data of firmware is received from the trap operation status management device 120 by broadcast (S2559). If the data is received, the CPU 130a stores the received data in the update data storage region based on the received address information (S2561), and updates the reception status (memory map) (S2563). Thereafter, the CPU 130a proceeds to S2557, to set the extension flag, and finishes the firmware update process.

In addition, if the CPU 130a determines that data of firmware by broadcast is not received in S2559, the CPU 130a determines whether or not a transmission request of a reception status (memory map) of itself is received from the trap operation status management device 120 by unicast (S2565). If the transmission request is received, the CPU 130a transmits the memory map together with the system constituent device ID of itself (S2567), and proceeds to S2557 to set the extension flag and finish the firmware update process.

If the CPU 130a determines the transmission request is not received in S2565, the CPU 130a determines whether or not retransmission data of firmware to itself is received from the trap operation status management device 120 by unicast (S2569). If the retransmission data is received, the CPU 130a stores the received retransmission data in the update data storage region based on the received address information (S2571), and updates the reception status (memory map) (S2573). Thereafter, the CPU 130a proceeds to S2557 to set the extension flag, and finishes the firmware update process.

Furthermore, if the CPU 130a determines that the retransmission data is not received in S2569, the CPU 130a determines whether or not rewrite permission to itself is received from the trap operation status management device 120 by unicast (S2575). If the rewrite permission is received, the CPU 130a performs a rewrite process of writing firmware stored in the update data storage region in an authorized storage region in the memory 110b (S2577). In this manner, the rewrite process of firmware is completed, and thus, the CPU 130a resets the start flag and the extension flag to "0" (S2579) and finishes the firmware update process. If the CPU 130a determines that the CPU 130a does not receive rewrite permission to itself by unicast in S2575, the CPU 130a finishes the rewrite process.

In the manner described above, in data transmission of update firmware, terminal devices (trap operation status provider devices 110) that responded to the start notification are specified as targets of data transmission. After transmission of transmission data by broadcast is completed, it is determined whether the specified trap operation status provider devices 110 have received the transmission data or not based on the reception status (memory map) by unicast, and a non-received portion of the transmission data is transmitted again to the corresponding trap operation status provider devices 110 as necessary. Accordingly, communication at the start and the end of data transmission is performed by unicast, and only transmission of transmission data is performed by broadcast. Thus, data transmission can be performed with reliability with reduction of a wireless communication band occupancy and battery consumption.

Other Embodiments (1) The trap operation status provider device and the communication relay device according to the first embodiment described above repeatedly perform activation and sleep in cycles based on time slots, but may be configured to operate (be able to communicate) constantly. In this case, the trap operation status management device does not need to issue an extension request, and a transmission time of data of firmware (in or after the period t2 of a time slot TS) does not be taken into consideration. In addition, it is unnecessary to manage data transmission progress information for each group. It is also unnecessary to, for example, transmit firmware in an operation status information acquisition transmission process, unlike the first embodiment.

Figure 28:
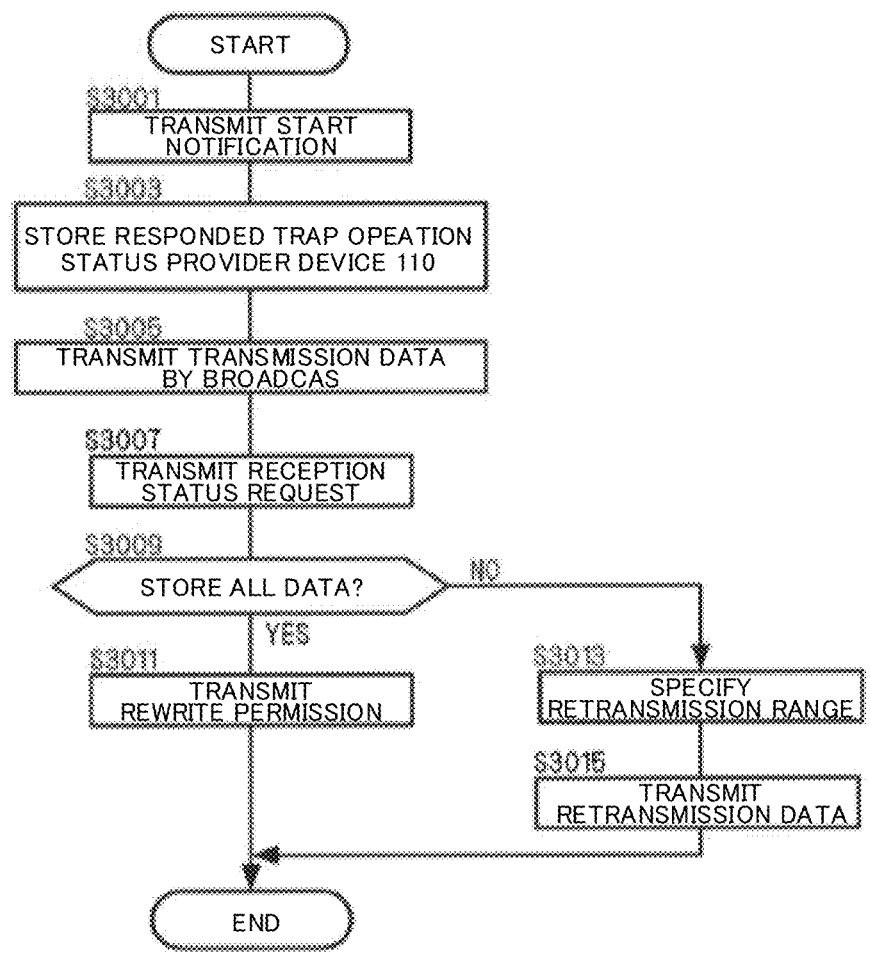
FIG. 28 is a flowchart depicting a firmware transmission process of a trap operation status management device according to another embodiment.
Figure 29:
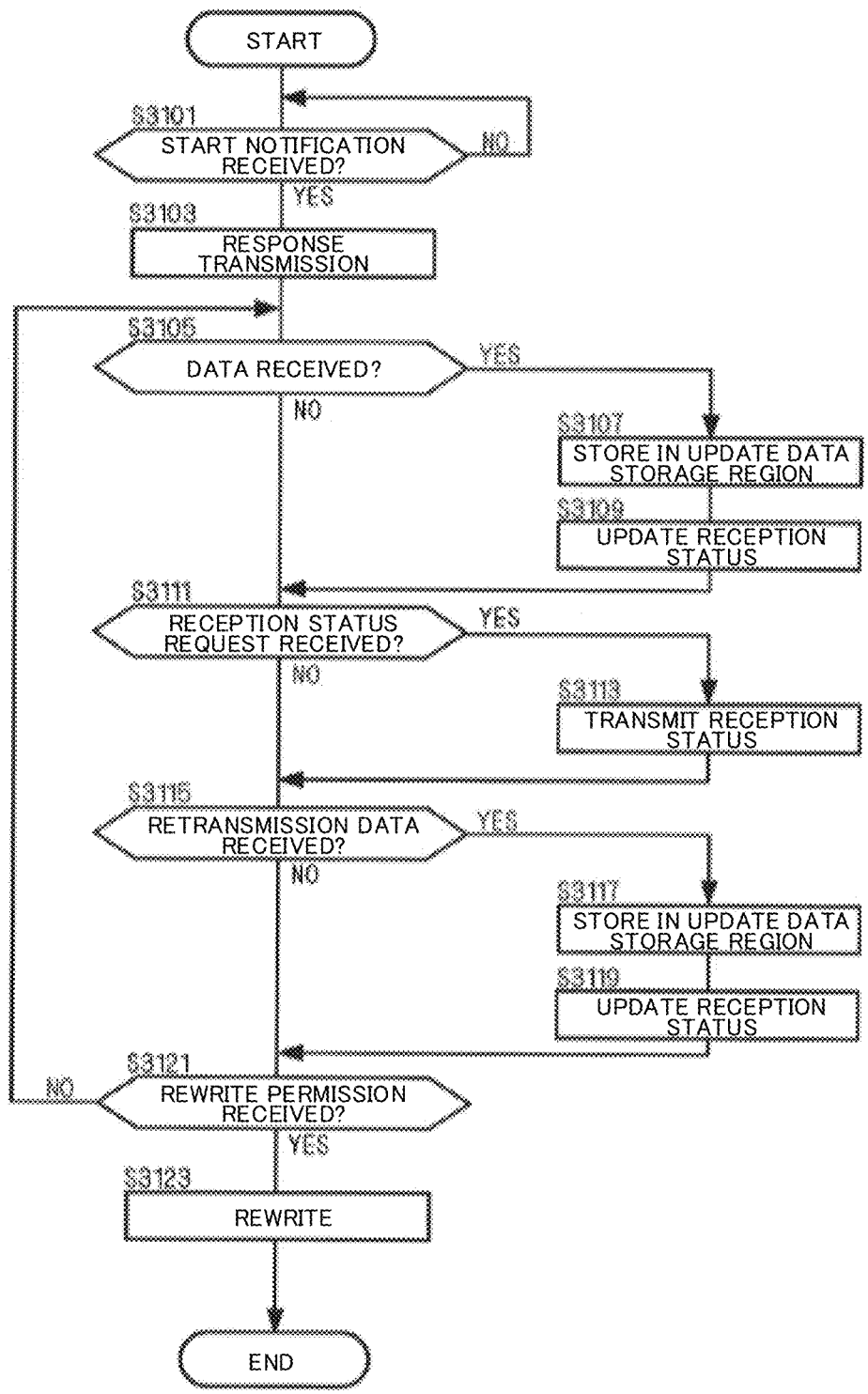
FIG. 29 is a flowchart depicting a firmware update process of a trap operation status provider device according to another embodiment.

Accordingly, firmware can be rewritten by the processes shown in FIGS. 28 and 29, for example. As shown in FIG. 28, the trap operation status management device (CPU) transmits start notification by unicast to each trap operation status provider device belonging to the trap operation status management system (S3001), and stores trap operation status provider devices (system constituent device IDs) that have responded to the start notification in the HDD (S3003). Thereafter, the trap operation status management device (CPU) transmits data of firmware by broadcast (S3005). In this case, firmware of a size that cannot be transmitted at a time can be divided for transmission.

After completion of the transmission, the trap operation status management device (CPU) issues a transmission request of a reception status to the trap operation status provider devices that have responded (S3007), and determines whether all the data of update firmware is stored in the update data storage region based on the received reception status. If all the data is stored, the trap operation status management device (CPU) transmits rewrite permission by unicast to the trap operation status provider devices that have responded (S3011). On the other hand, if all the data is not stored, the trap operation status management device (CPU) specifies an address range of data to be transmitted again in firmware based on the reception status (S3013), and transmits data in the specified address range as retransmission data (S3015). The reception status may be a memory map.

On the other hand, as shown in FIG. 29, the trap operation status provider device (CPU) waits for reception of start notification to itself (S3101). If the start notification is received, the trap operation status provider device (CPU) performs response transmission to start notification (S3103). Thereafter, the trap operation status provider device (CPU) performs a process in accordance with the received content from the trap operation status management device until rewriting is completed.

If it is determined that data of firmware is received by broadcast in S3105, the trap operation status provider device (CPU) stores the received data in the update data storage region based on the received address information (S3107), and updates the reception status (S3109). If it is determined that a transmission request of the reception status is received in S3111, the trap operation status provider device (CPU) transmits the reception status (S3113).

In addition, if it is determined that retransmission data is received in S3115, the trap operation status provider device (CPU) stores the received retransmission data in the update data storage region based on the received address information (S3117), and updates the reception status (S3119). If it is determined that rewrite permission is received in S3121, the trap operation status provider device (CPU) rewrites firmware (S3123), and finishes the process.

(2) The operating time of the trap operation status management device according to the first embodiment continues to the end time in the period t1 of the time slot, but the device may constantly operate in the periods t1 through t3. In this case, the trap operation status management device does not need to issue an extension request to the trap operation status provider device.

(3) In the first embodiment described above, the memory map is used as the reception status, but any configuration may be employed as long as the reception status can be specified. The configuration of the memory map is not limited to the configuration described above.

(4) In the first embodiment described above, all the trap operation status provider devices belonging to the trap operation status management system are targets of transmission of update firmware. Alternatively, some of the trap operation status provider devices may be transmission targets. In this case, the start notification is transmitted by unicast to the some of the trap operation status provider devices. Trap operation status provider devices that have not received start notification, for example, does not store received data even in the case of receiving data of update firmware by broadcast subsequently because the devices have not received start notification.

(5) The first embodiment described above is directed to the trap operation status management system employing the data transmission system. The present invention, however, is not limited to trap operation status management systems as long as a management device and terminal devices communicate with each other by way of communication relay devices on a communication network. Data to be transmitted is not limited to firmware, and various types of data may be used.

(6) Flowchart for each program: In the first embodiment described above, in the trap operation status management system, processes are executed according to the flowcharts shown in FIGS. 18 and 20 through 29. The flowchart, however, is not limited to this example as long as functions and the objects of the processes can be achieved.

(7) Data structure: In trap operation status management system according to the first embodiment described above, the processes are executed by using data shown in FIGS. 8 through 10 and 12 through 17, but the data structure is not limited to this example as long as the functions and the objects of the processes can be achieved.

(8) In the first embodiment, broadcast is used as an example of one-to-multiple communication, but broadcast may be replaced by multicast. Multicast refers to a communication mode in which data is simultaneously transmitted to a large number of specified destinations (in one way) by using a multicast address (an address specifying a plurality of specific nodes) in a network (e.g., in the same LAN). In this case, multicast transmission is performed on trap operation status provider devices 110 that have responded to start notification of firmware transmission by unicast.

The data transmission system according to an aspect of the invention is useful for performing data transmission with high reliability by using both one-to-one communication and one-to-multiple communication while obtaining reduction of a wireless communication band occupancy and battery consumption, and can be used for, for example, transmitting firmware of a trap operation status management system that manages an operation status of a steam trap in a steam plant.

What is claimed is:

1. A management device that transmits data to a plurality of terminal devices by way of communication relay devices on a connected communication network and controls the plurality of terminal devices, the management device comprising:
a transmission data storage section that stores transmission data; and
a communication control section that controls communication with the plurality of terminal devices, wherein
the communication control section
issues start notification of data transmission in one-to-one communication to each terminal device that is a transmission target of the plurality of terminal devices, and receives a response from one or more of the plurality of terminal devices in response to the start notification,
starts, regardless of whether each terminal device has responded to the start notification or not, transmission of the transmission data in one-to-multiple communication after the start notification, and
issues, after completion of the transmission of the transmission data, a transmission request of a reception status of the transmission data in one-to-one communication to the one or more of the plurality of terminal devices that responded to the start notification,
the management device further comprising a group information storage section that stores group information on groups to which each of the plurality of terminal devices belongs, information on a communication time frame of one or more terminal devices for each group, and a progress status of transmission of the transmission data for each group, wherein
the communication control section
issues the start notification, transmits the transmission data, and issues the transmission request to each terminal device belonging to a group in a transmissible state, based on the group information and the information on the communication time frame, and transmits the transmission data to each terminal device belonging to the group in the transmissible state based on the progress status and updates the progress status of the group.

2. A data transmission system comprising:
a plurality of terminal devices;
a management device that controls the plurality of terminal devices; and
communication relay devices that relay communication between the terminal devices and the management device, the terminal devices, the management device, and the communication relay devices being connected to a communication network so that the management device transmits data to the plurality of terminal devices, wherein
the management device includes a transmission data storage section that stores transmission data and a first communication control section that controls communication with the plurality of terminal devices,
the terminal device includes a second communication control section that controls communication with the management device and a received data storage section that stores received transmission data,
the first communication control section
issues start notification of data transmission in one-to-one communication to each terminal device that is a transmission target of the plurality of terminal devices, and receives a response from one or more of the plurality of terminal devices in response to the start notification,
starts, regardless of whether each terminal device has responded to the start notification or not, transmission of the transmission data in one-to-multiple communication after the start notification, and
issues, after completion of transmission of the transmission data, a transmission request of a reception status of the transmission data in one-to-one communication to the one or more of the plurality of terminal devices that responded to the start notification, and
the second communication control section responds to the management device in response to the received start notification, then stores the received transmission data in the received data storage section, and transmits the reception status in response to the transmission request, wherein
the management device further includes a group information storage section that stores group information on groups to which each of the plurality of terminal devices belongs, information on a communication time frame of one or more terminal devices for each group, and a progress status of transmission of the transmission data for each group, and
the first communication control section
issues the start notification, transmits the transmission data, and issues the transmission request to each terminal device belonging to a group in a transmissible state, based on the group information and the information on the communication time frame, and transmits the transmission data to each terminal device belonging to the group in the transmissible state based on the progress status and updates the progress status of the group.

3. A non-transitory recording medium recording a data transmission program that causes a computer of a management device that transmits data to a plurality of terminal devices by way of communication relay devices on a connected communication network and controls the plurality of terminal devices, to function as a communication control section that controls communication with the plurality of terminal devices, wherein
the communication control section
issues start notification of data transmission in one-to-one communication to each terminal device that is a transmission target of the plurality of terminal devices, and receives a response from one or more of the plurality of terminal devices in response to the start notification,
starts, regardless of whether each terminal device has responded to the start notification or not, transmission of transmission data stored in a storage section in one-to-multiple communication after the start notification, and issues, after completion of transmission of the transmission data, a transmission request of a reception status of the transmission data in one-to-one communication to the one or more of the plurality of terminal devices that responded to the start notification, wherein the management device includes a group information storage section that stores group information on groups to which each of the plurality of terminal devices belongs, information on a communication time frame of one or more terminal devices for each group, and a progress status of transmission of the transmission data for each group, and the communication control section issues the start notification, transmits the transmission data, and issues the transmission request to each terminal device belonging to a group in a transmissible state, based on the group information and the information on the communication time frame, and transmits the transmission data to each terminal device belonging to the group in the transmissible state based on the progress status and updates the progress status of the group.

4. A data transmission method in which a plurality of terminal devices, a management device that controls the plurality of terminal devices, and communication relay devices that relay communication between the terminal devices and the management device are connected to a communication network so that the management device transmits data to the plurality of terminal devices, the method comprising the steps of:

issuing start notification of data transmission in one-to-one communication from the management device to each terminal device that is a transmission target of the plurality of terminal devices, and receiving a response from one or more of the plurality of terminal devices in response to the start notification by the management device;

starting, regardless of whether each terminal device has responded to the start notification or not, transmission of transmission data in one-to-multiple communication from the management device after the start notification;

issuing, after completion of transmission of the transmission data, a transmission request of a reception status of the transmission data in one-to-one communication from the management device to the one or more of the plurality of terminal devices that responded to the start notification; and responding by the terminal device to the management device in response to the received start notification, and then, storing by the terminal device the received transmission data in a received data storage section, and transmitting by the terminal device the reception status in response to the transmission request, wherein the management device includes a group information storage section that stores group information on groups to which each of the plurality of terminal devices belongs, information on a communication time frame of one or more terminal devices for each group, and a progress status of transmission of the transmission data for each group, and in the steps of issuing the start notification, starting transmission of the transmission data, and issuing the transmission request for the reception status, the issuing of the start notification, starting of the transmission of the transmission data, and issuing of the transmission request are performed to each terminal device belonging to a group in a transmissible state, based on the group information and the information on the communication time frame, and in the step of starting transmission of the transmission data, the transmission data is transmitted to each terminal device belonging to the group in the transmissible state based on the progress status and the progress status of the group is updated.

* * * * *